US008472711B2

(12) United States Patent
Hasegawa

(10) Patent No.: US 8,472,711 B2
(45) Date of Patent: Jun. 25, 2013

(54) IMAGE PROCESSING DEVICE FOR PROCESSING IMAGES ACCORDING TO THE AVAILABLE STORAGE CAPACITY

(75) Inventor: Tomohiko Hasegawa, Nagoya (JP)

(73) Assignee: Brother Kogyo Kabushiki Kaisha, Aichi-Ken, Nagoya-Shi (JP)

(*) Notice: Subject to any disclaimer, the term of this patent is extended or adjusted under 35 U.S.C. 154(b) by 1186 days.

(21) Appl. No.: 11/931,541

(22) Filed: Oct. 31, 2007

(65) Prior Publication Data

US 2008/0298723 A1 Dec. 4, 2008

(30) Foreign Application Priority Data

Oct. 31, 2006 (JP) ................ P2006-297132

(51) Int. Cl.
*G06K 9/00* (2006.01)
*G03F 3/08* (2006.01)
*G09G 5/02* (2006.01)
*H03L 7/00* (2006.01)

(52) U.S. Cl.
USPC ............ 382/167; 358/518; 345/589; 348/543

(58) Field of Classification Search
None
See application file for complete search history.

(56) References Cited

U.S. PATENT DOCUMENTS

| 6,166,824 | A | 12/2000 | Kadota | |
|---|---|---|---|---|
| 6,816,623 | B1* | 11/2004 | Maruta et al. | 382/274 |
| 6,885,482 | B1 | 4/2005 | Kubo et al. | |
| 7,409,093 | B2* | 8/2008 | Ju | 382/232 |
| 2002/0067515 | A1* | 6/2002 | Abe | 358/442 |
| 2004/0091164 | A1* | 5/2004 | Sakatani et al. | 382/254 |
| 2005/0036653 | A1* | 2/2005 | Brundage et al. | 382/100 |
| 2006/0056728 | A1* | 3/2006 | Silverbrook et al. | 382/276 |
| 2007/0040914 | A1* | 2/2007 | Katagiri et al. | 348/221.1 |

FOREIGN PATENT DOCUMENTS

| JP | 7-221948 | 8/1995 |
|---|---|---|
| JP | H08-149281 | 6/1996 |
| JP | 10-202962 | 8/1998 |
| JP | 2000-59613 | 2/2000 |
| JP | 2000-196883 | 7/2000 |
| JP | 2000-253223 | 9/2000 |
| JP | 2001-24823 | 1/2001 |
| JP | 2001-69525 | 3/2001 |
| JP | 2002-127512 | 5/2002 |
| JP | 2003-219150 | 7/2003 |

(Continued)

OTHER PUBLICATIONS

Rahman et al. Multi-Scale Retinex for Color Image Enhancement, Sep. 1996, Image Processing, 1996. Proceedings., International Conference, vol. 3 1003-1006.*

(Continued)

*Primary Examiner* — Randolph I Chu
(74) *Attorney, Agent, or Firm* — Scully, Scott, Murphy & Presser, P.C.

(57) ABSTRACT

An image processor includes a memory calculating unit, a storing unit, a mode selecting unit, and a Retinex process performing unit. The memory amount calculating unit calculates, based on an original size of an original image having an original pixels, a required memory amount required for performing a Retinex process on the original image. The storing unit has a usable memory area that can be used in performing the Retinex process on the original image. The usable memory area has a usable memory amount. The mode selecting unit selects a mode from among a plurality of modes based on both the usable memory amount and the required memory amount. The Retinex process performing unit performs the Retinex process on the original image in the selected mode.

11 Claims, 15 Drawing Sheets

FOREIGN PATENT DOCUMENTS

| JP | 2003-251869 | 9/2003 |
|---|---|---|
| JP | 2004-165840 | 6/2004 |
| JP | 2005-5864 | 1/2005 |
| JP | 3731577 | 10/2005 |

OTHER PUBLICATIONS

Rahman et al. Acomparison of the Multiscale Retinex With Other Image Enhancement Technique, IS&T's 50th Annual Conference, 1997.*

Jobson et al. A Multiscale Retinex for Bridging the Gap Betwwen Color Images and Human Observation of Scenes, IEEE Transactions on Image Processing, vol. 6, No. 7, Jul. 1997, 965-976.*

Rahman et al, Retinex Processing for automatic image enhancement, Jan. 2004, Journal of Electronic Imaging 13(1), 100-110.*

Rahman et al. , "Properties and Performance of a Center/Surround Retinex", Mar. 1997, IEEE Transactions on Image Processing, vol. 6, No. 3, p. 451-462.*

* cited by examiner (PROCESS EXECUTED ON THE PRINTER)

FIG.12

TABLE FOR PHOTO MODE

| PRINT MODE | PAPER TYPE | PAPER SIZE | ORIGINAL IMAGE SIZE | REDUCED IMAGE SIZE | REDUCTION ALGORITHM |
|---|---|---|---|---|---|
| PHOTO MODE | GLOSSY PAPER | 4″ × 6″ | 600 × 800[pixel] | 150 × 200[pixel] | ME |
| | | | 1200 × 1600[pixel] | 300 × 400[pixel] | ME |
| | | | 2400 × 3200[pixel] | 450 × 600[pixel] | ME |
| | | 5″ × 7″ | 600 × 800[pixel] | 150 × 200[pixel] | ME |
| | | | 1200 × 1600[pixel] | 300 × 400[pixel] | ME |
| | | | 2400 × 3200[pixel] | 450 × 600[pixel] | ME |
| | | LETTER | 600 × 800[pixel] | 300 × 400[pixel] | BL |
| | | | 1200 × 1600[pixel] | 450 × 600[pixel] | BL |
| | | | 2400 × 3200[pixel] | 450 × 600[pixel] | ME |
| | | A4 | 600 × 800[pixel] | 300 × 400[pixel] | BL |
| | | | 1200 × 1600[pixel] | 450 × 600[pixel] | BL |
| | | | 2400 × 3200[pixel] | 450 × 600[pixel] | ME |
| | PLAIN PAPER | 4″ × 6″ | 600 × 800[pixel] | 150 × 200[pixel] | NN |
| | | | 1200 × 1600[pixel] | 150 × 200[pixel] | NN |
| | | | 2400 × 3200[pixel] | 150 × 200[pixel] | BL |
| | | 5″ × 7″ | 600 × 800[pixel] | 150 × 200[pixel] | NN |
| | | | 1200 × 1600[pixel] | 150 × 200[pixel] | NN |
| | | | 2400 × 3200[pixel] | 150 × 200[pixel] | BL |
| | | LETTER | 600 × 800[pixel] | 150 × 200[pixel] | NN |
| | | | 1200 × 1600[pixel] | 300 × 400[pixel] | NN |
| | | | 2400 × 3200[pixel] | 300 × 400[pixel] | NN |
| | | A4 | 600 × 800[pixel] | 150 × 200[pixel] | NN |
| | | | 1200 × 1600[pixel] | 300 × 400[pixel] | NN |
| | | | 2400 × 3200[pixel] | 300 × 400[pixel] | NN |

FIG.13

TABLE FOR NORMAL MODE

| PRINT MODE | PAPER TYPE | PAPER SIZE | ORIGINAL IMAGE SIZE | REDUCED IMAGE SIZE | REDUCTION ALGORITHM |
|---|---|---|---|---|---|
| NORMAL MODE | GLOSSY PAPER | 4″ × 6″ | 600 × 800[pixel] | 150 × 200[pixel] | BL |
| | | | 1200 × 1600[pixel] | 150 × 200[pixel] | BL |
| | | | 2400 × 3200[pixel] | 300 × 400[pixel] | BL |
| | | 5″ × 7″ | 600 × 800[pixel] | 150 × 200[pixel] | BL |
| | | | 1200 × 1600[pixel] | 150 × 200[pixel] | BL |
| | | | 2400 × 3200[pixel] | 300 × 400[pixel] | BL |
| | | LETTER | 600 × 800[pixel] | 150 × 200[pixel] | BL |
| | | | 1200 × 1600[pixel] | 300 × 400[pixel] | BL |
| | | | 2400 × 3200[pixel] | 300 × 400[pixel] | BL |
| | | A4 | 600 × 800[pixel] | 150 × 200[pixel] | BL |
| | | | 1200 × 1600[pixel] | 300 × 400[pixel] | NN |
| | | | 2400 × 3200[pixel] | 300 × 400[pixel] | BL |
| | PLAIN PAPER | 4″ × 6″ | 600 × 800[pixel] | 150 × 200[pixel] | NN |
| | | | 1200 × 1600[pixel] | 150 × 200[pixel] | NN |
| | | | 2400 × 3200[pixel] | 150 × 200[pixel] | NN |
| | | 5″ × 7″ | 600 × 800[pixel] | 150 × 200[pixel] | NN |
| | | | 1200 × 1600[pixel] | 150 × 200[pixel] | NN |
| | | | 2400 × 3200[pixel] | 150 × 200[pixel] | NN |
| | | LETTER | 600 × 800[pixel] | 150 × 200[pixel] | NN |
| | | | 1200 × 1600[pixel] | 150 × 200[pixel] | NN |
| | | | 2400 × 3200[pixel] | 150 × 200[pixel] | NN |
| | | A4 | 600 × 800[pixel] | 150 × 200[pixel] | NN |
| | | | 1200 × 1600[pixel] | 150 × 200[pixel] | NN |
| | | | 2400 × 3200[pixel] | 150 × 200[pixel] | NN |

IMAGE PROCESSING DEVICE FOR PROCESSING IMAGES ACCORDING TO THE AVAILABLE STORAGE CAPACITY

CROSS REFERENCE TO RELATED APPLICATION

This application claims priority from Japanese Patent Application No. 2006-297132 filed Oct. 31, 2006. The entire content of each of these priority applications is incorporated herein by reference.

TECHNICAL FIELD

The present invention relates to an image processor capable of processing images according to a method most suited to a storage capacity available for performing a Retinex process.

BACKGROUND

When taking a photograph of a subject under backlit conditions, e.g. against the sun, the image of the subject portion is an indistinct backlit image with low lightness and contrast, making it difficult to make out details of the subject. Image processing is performed to improve the quality of these backlit images, as well as images suffering in quality due to overexposure, underexposure, blurring due to jiggling when capturing the image, noise, insufficient light, and the like, in order to improve lightness and contrast in the image. One method used in conventional image processing is a Retinex process.

The Retinex process preserves the input image data for high-quality regions and improves the image quality primarily in low-quality regions. The Retinex process uses Gaussian filters for calibrating pixel data in the original image to values reflecting data of surrounding pixels, calculates reflectance component data for the original image from the natural logarithm of the calibrated pixel data, and calculates illuminance component data by dividing pixel data of the original image by reflectance component data of the original image. Specifically, this process divides the original image into reflectance components and illuminance components. Next, a process is performed to calibrate the brightness and level (contrast) of the luminance component through gamma correction or the like and subsequently generates improved image data for the original image in backlit portions and the like by combining the calibrated illuminance components with the reflectance components.

U.S. Pat. No. 6,885,482 (corresponding to Japanese Patent Application Publication No. 2001-69525) discloses a method of converting RGB values to a color space configured of a luminance component and color components, such as YCbCr or YIQ, performing the Retinex process only on the luminance component Y, while maintaining the color components, and converting the values back to ROB. Calibrating only the luminance component (i.e. not calibrating the color components) prevents an upset in the color balance and a shift in color. Further, since the Retinex process is performed only on the luminance component, this method requires fewer calculations than a method for performing the Retinex process on each RGB plane and, hence, can complete the process quicker.

U.S. Patent Application Publication No. 2004/0091164 (corresponding to Japanese Patent No. 3,731,577) discloses a method for improving the processing speed in the Retinex process. This method forms a reduced image (low-resolution image) from the original image using the average pixel method or the like, forms a peripheral (surround) average pixel value image (blurred image) by finding the peripheral (surround) average pixel value for each pixel in the reduced image, forms a Retinex processed image from the original image and an image produced by expanding the blurred image, and forms an output image from the original image and the Retinex processed image.

SUMMARY

It is an object of the present invention to provide an image processor and an image processing method capable of processing images according to a method most suited to the storage capacity available for performing the Retinex process.

In order to attain the above and other objects, the present invention provides an image processor including a memory calculating unit, a storing unit, a mode selecting unit, and a Retinex process performing unit. The memory amount calculating unit calculates, based on an original size of an original image having an original pixels, a required memory amount required for performing a Retinex process on the original image. The storing unit has a usable memory area that can be used in performing the Retinex process on the original image. The usable memory area has a usable memory amount. The mode selecting unit selects a mode from among a plurality of modes based on both the usable memory amount and the required memory amount. The Retinex process performing unit performs the Retinex process on the original image in the selected mode.

Another object of the present invention provides an image processor including a memory amount calculating unit, a storing unit, a pixel group determining unit, and a Retinex process performing unit. The memory amount calculating unit calculates, based on an original size of an original image having an original pixels, a required memory amount required for performing a Retinex process on the original image. The storing unit has a usable memory area capable of storing a pixel group. The pixel group is based on the plurality of original pixels. The usable memory area has a usable memory amount. The pixel group determining unit determines the number of the pixels included in the pixel group, based on both the usable memory amount and the required memory amount. The Retinex process performing unit performs the Retinex process on the original image. The Retinex process performing unit includes a correction value determining unit and a correcting unit. The correction value determining unit determines a correction value based on the number of the pixels in the pixel group. The correcting unit corrects the original image based on the correction value.

Another object of the present invention provides an image processing method including calculating: based on an original size of an original image, a required memory amount required for performing a Retinex process on the original image having an original pixels; detecting a usable memory amount of a usable memory area that can be used in performing the Retinex process on the original image; selecting a mode from among a plurality of modes based on both the usable memory amount and the required memory amount; and performing the Retinex process on the original image in the selected mode.

Another object of the present invention provides an image processing method including: calculating, based on an original size of an original image, a required memory amount required for performing a Retinex process on all of a plurality of original pixels of the original image; detecting a usable memory amount of a usable memory are that can be used in performing the Retinex process on the original image, the usable memory area being capable of storing a pixel group that is based on the plurality of original pixels; determining the number of the pixels included in the pixel group, based on both the usable memory amount and the required memory amount; and performing the Retinex process on the original image. The Retinex process performing includes: determining a correction value based on the number of the pixels in the pixel group; and correcting the original image based on the correction value.

Another object of the present invention provides a storage medium storing a set of program instructions executable on an image processor. The set of program instructions includes: calculating, based on an original size of an original image, a required memory amount required for performing a Retinex process on the original image having an original pixels; detecting a usable memory amount of a usable memory area that can be used in performing the Retinex process on the original image; selecting a mode from among a plurality of modes based on both the usable memory amount and the required memory amount; and performing the Retinex process on the original image in the selected mode.

Another aspect of the present invention provides a storage medium storing a set of program instructions executable on an image processor. The set of program instructions includes: calculating, based on an original size of an original image, a required memory amount required for performing a Retinex process on all of a plurality of original pixels of the original image; detecting a usable memory amount of a usable memory area that can be used in performing the Retinex process on the original image, the usable memory area being capable of storing a pixel group that is based on the plurality of original pixels; determining the number of the pixels included in the pixel group, based on both the usable memory amount and the required memory amount; and performing the Retinex process on the original image. The Retinex process performing includes: determining a correction value based on the number of the pixels in the pixel group; and correcting the original image based on the correction value.

BRIEF DESCRIPTION OF THE DRAWINGS

The particular features and advantages of the invention as well as other objects will become apparent from the following description taken in connection with the accompanying drawings, in which:

FIG. 12 is a table for a photo mode referenced for setting the reduced image size and a reduction algorithm according to the second embodiment;

FIG. 13 is a table for a normal mode referenced for setting the reduced image size and reduction algorithm according to the second embodiment;

DETAILED DESCRIPTION

Figure 1:
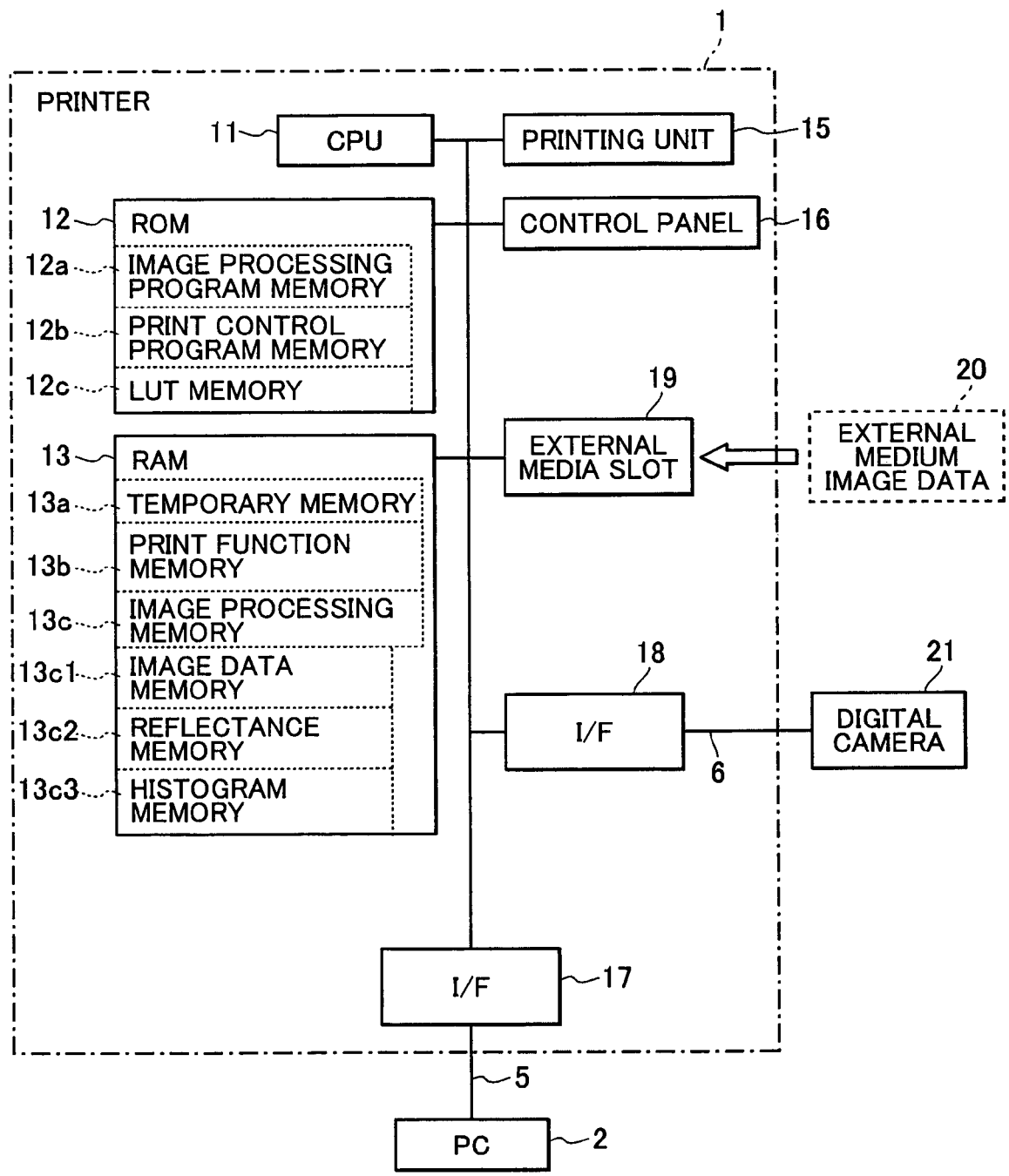
FIG. 1 is a block diagram showing the electrical structure of a printer provided with an images processing program according to an embodiment.

A first embodiment of the present invention will be described while referring to the accompanying drawings. FIG. 1 is a block diagram showing the structure of a system including a printer 1 having a function for performing an image process according to the preferred embodiment, a personal computer (hereinafter referred to as a "PC") 2 connected to the printer 1 via an interface 17, and a digital camera 21 connected to the printer 1 via an interface 18.

The printer 1 executes an image-processing program stored in a ROM 12 of the printer 1 to perform a Retinex process on image data (original image data) inputted from the PC 2, digital camera 21, or an external medium 20 and to correct low-quality regions of the image data, such as backlit image regions.

As shown in FIG. 1, the printer 1 includes a CPU 11; the ROM 12; a RAM 13; a printing unit 15 having a print head and the like for printing out image data on a printing medium, such as paper; a control panel 16 through which the user can select functions and input parameters for each function, and the like; the interface 17 for interfacing with the PC 2; the interface 18 for interfacing with the digital camera 21; and an external media slot 19 enabling the user to detachably mount, in the printer 1, the external medium 20 configured to store image data and the like.

The interface 17 is connected to the PC 2 via a cable 5. The interface 18 is connected to the digital camera 21 via a cable 6. The interfaces 17 and 18 use the Universal Serial Bus (USB) communication method. The external medium 20 is a memory card configured of flash memory, such as an SD card or a Memory Stick.

Image data stored in the PC 2 can be inputted into the printer 1 via the cable 5 and the interface 17, while image data captured by the digital camera 21 can be inputted into the printer 1 via the cable 6 and the interface 18. Further, image data stored on the external medium 20 can be inputted into the printer 1 when the external medium 20 is mounted in the external media slot 19. Printing parameters set with the PC 2 are inputted into the printer 1 via the cable 5 and the interface 17 and stored in a print function memory 13b.

The CPU 11 is an arithmetic processor that controls the overall operations of the printer 1. The ROM 12 stores various control programs executed by the CPU 11 and fixed values used when the CPU 11 executes the programs. The ROM 12 includes an image-processing program memory 12a storing an image-processing program for performing such image processing as the Retinex process, a print control program memory 12b storing a print control program for executing a printing operation, and an LUT memory 12c storing a look-up table referenced when executing the image-processing program. The look-up table stored in the LUT memory 12c will be described later with reference to FIGS. 12 and 13.

The RAM 13 is a rewritable random-access memory that includes a temporary memory 13a having a work area for storing a set of registers required when the CPU 11 executes the control programs, a temporary area for temporarily storing data during such processes, and the like; the print function memory 13b serving to store printing parameters set by the user for performing a printing operation, print data, and the like; and an image processing memory 13c used for performing image processing. The size of each memory area is set by a program based on conditions for the function chosen by the user. For example, when image data is inputted for a printing operation, the printer 1 stores this image data in the print function memory 13b and reduces the size of the other storage areas.

The temporary memory 13a stores, in image processing, the size of the original image, the size of the reduced image, reduction algorithm required for reducing the original image, and an allocated memory amount of the image processing memory 13c described later. Specifically, data representing the size of an original image, such as the number of horizontal and vertical pixels, is stored in the temporary memory 13a.

The print function memory 13b stores printing parameters and printing image data. The printing parameters are values set by the user indicating whether the print mode is a high-quality photo mode or a normal quality normal mode; whether the type of recording medium is glossy paper, inkjet paper, or plain paper; and whether the size of the recording medium is A4, B5, letter, or the like.

When performing a Retinex process using a reduced image, the size of the reduced image and an algorithm for reducing the original image are set based on these printing parameters and the size of the original image. A large reduced image size is set when emphasizing image quality, while a small reduced image size is set when emphasizing processing speed over image quality. The reduction algorithm is selected from among the nearest neighbor method, bi-linear method, average pixel method, and the like.

In the bi-linear method or average pixel method, pixel values in the reduced image are calculated by performing such operations as weighting a plurality of pixel values surrounding a corresponding position in the original image. However, when the original pixel values are expressed in integers, the calculated values have decimals. Rounding off the values to the right of the decimal point, leaving integer values, produces error that may reduce the quality of the corrected image.

Memory areas are allocated in the image processing memory 13c as needed. These memory areas may include an image data memory 13c1 serving to store image data subjected to image processing, a reflectance memory 13c2 for storing reflectance values found in the Retinex process, and a histogram memory 13c3 for storing frequencies of reflectance values to form a histogram from which parameters for performing normalization are found.

Depending on the image processing method, the image data memory 13c1 may store values of all pixels in an original image, and pixels values in a reduced image obtained by reducing the original image to a prescribed size based on a prescribed reduction algorithm. The printer 1 forms the reduced image by reading data for a number of lines required for forming the reduced image.

One line of original image data is stored in the image data memory 13c1 when the reduction algorithm is the nearest neighbor method, two lines when the reduction algorithm is the bi-linear method, three lines when the reduction algorithm is the bi-cubic algorithm, and a line number corresponding to the reduction ratio when the reduction algorithm is the average pixel method.

In the embodiment, the original image data and output image data are configured of RGB values, each of which has a data size (or data length) of 8 bits indicating a value in the range 0-255.

The RGB values include components representing the three primary colors of light, i.e. an R value representing red, a G value representing green, and a B value representing blue. The combination of RGB values for each pixel of an input image indicates one color (hue, intensity, etc.). The greater the RGB values, the higher the luminance (brightness).

The reflectance memory 13c2 is used for storing reflectance values $R(x, y)$ or $Rs(x, y)$ obtained in the Retinex process for only luma signals of the original image or reduced image.

The histogram memory 13c3 is used for tabulating the frequency of the reflectance values $Rs(x, y)$ to form a histogram. After the histogram is created, an upper limit and lower limit of a clipped range are set as parameters for normalization based on the histogram.

The control panel 16 is provided with LCDs for indicating printing parameters and the like, and various buttons for setting printing parameters or parameters related to image processing and for indicating a desire to execute an image process or a printing process.

Next, an image process executed by the printer 1 will be described with reference to FIGS. 2 through 8. The printer 1 firstly allocates memory for the image process based on current usage conditions, and then determines whether the allocated memory amount is greater than the memory amount required for storing all pixels in the original image undergoing the image process. When the allocated memory amount is sufficient for storing all pixels in the original image, the printer 1 selects a processing method in which all pixels are stored. When the allocated memory amount is insufficient for storing all pixels, the printer 1 selects a processing method for reducing the original image according to a reduction technique suited to the allocated memory amount.

Figure 2:
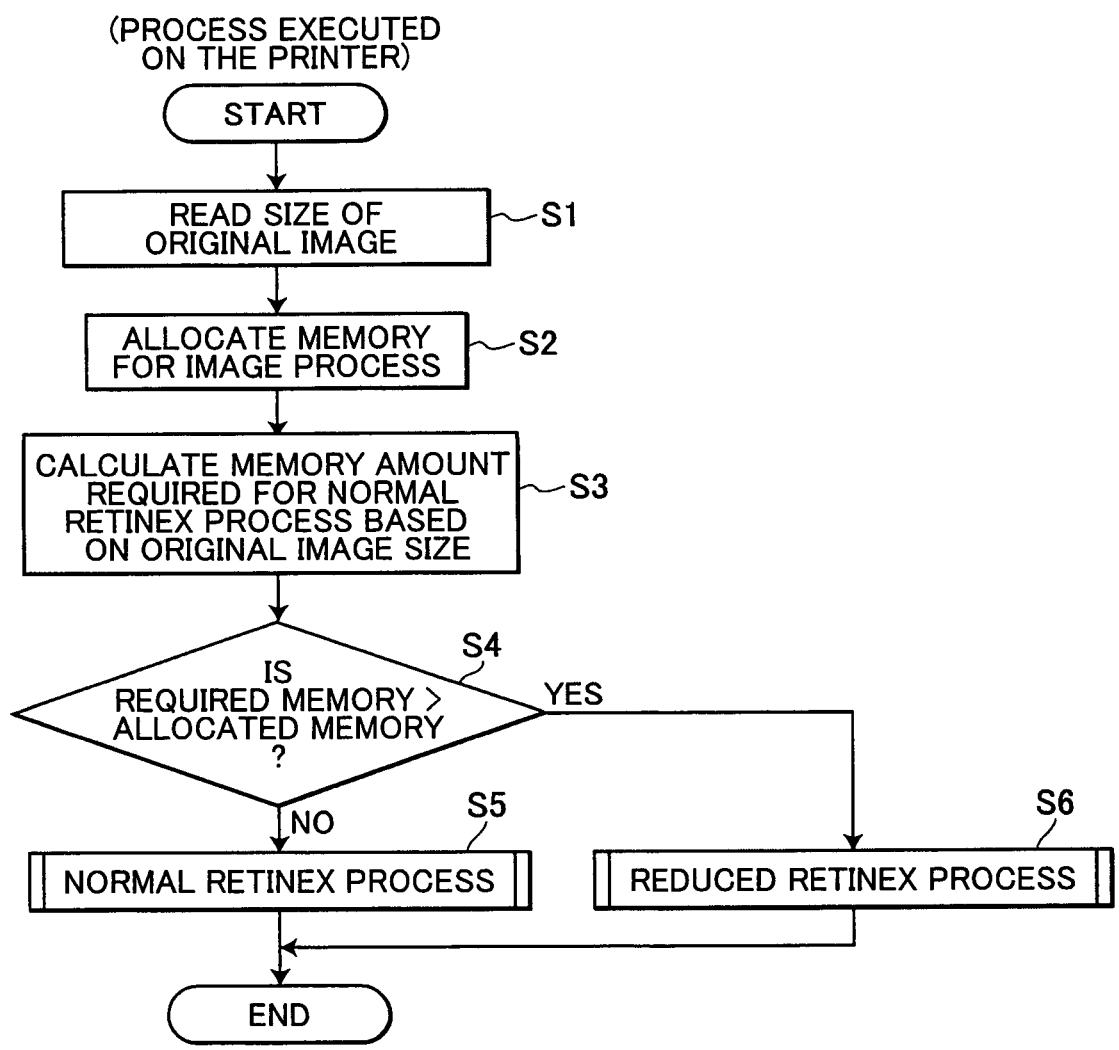
FIG. 2 is a flowchart illustrating steps in a process executed by the image-processing program.

FIG. 2 is a flowchart illustrating steps in a process started when the user selects an image to be processed and issues a command to begin the image process. In S1 of FIG. 2, the CPU 11 reads the size of the original image from a file in which the selected image is stored and stores this size in the temporary memory 13a. Data indicating the size of the original image is stored in a header or the like of the file containing the original image and is expressed in the number of vertical and horizontal pixels of the image, for example.

In S2 the CPU 11 allocates the image processing memory 13c based on the current usage of the printer 1 and stores data indicating the allocated memory amount of the image processing memory 13c in the temporary memory 13a. In S3 the CPU 11 calculates the memory amount required for a normal Retinex process based on the size of the original image stored in the temporary memory 13a.

Figure 3:
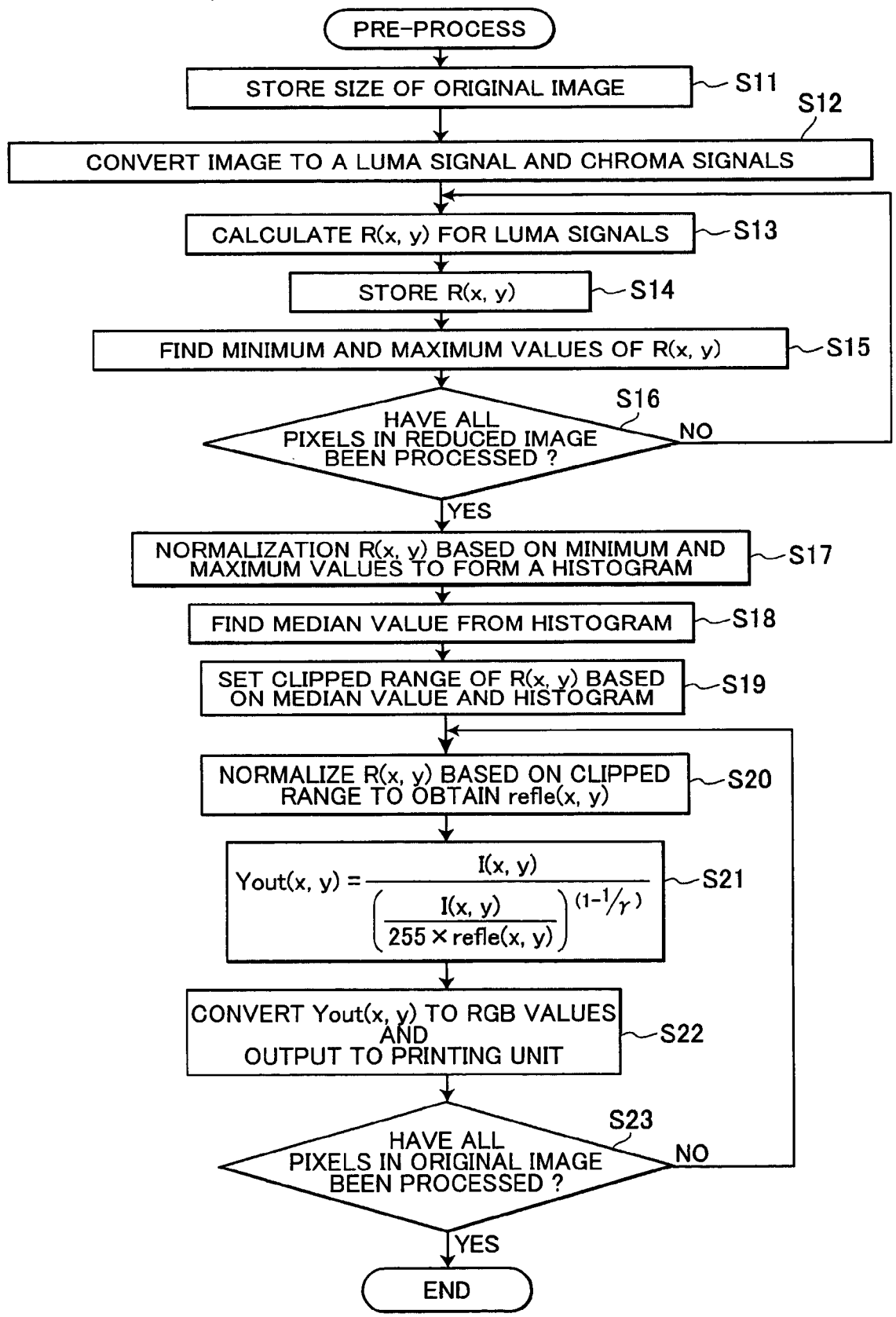
FIG. 3 is a flowchart illustrating steps in an image process performed when storing all pixels of an original image.

This normal Retinex process described in the flowchart of FIG. 3 in detail involves storing pixel values for all pixels in the original image in the image processing memory 13c1, storing reflectance values for the original image found in the Retinex process in the reflectance memory 13c2, and forming a histogram of these reflectance values in the histogram memory 13c3. While the normal Retinex process can obtain the best image quality, considerable time is required for image processing.

In S4 the CPU 11 determines whether the memory amount required for a normal Retinex process is greater than the allocated memory amount. If the memory amount required for the normal Retinex process is not greater than the allocated memory amount (S4: NO), then in S5 the CPU 11 performs the normal Retinex process. However, if the memory amount required for the normal Retinex process is greater than the allocated memory amount (S4: YES), then in S6 the CPU 11 performs a reduced Retinex process.

The reduced Retinex process is a technique for finding a clipped range of reflectance values based on a reduced image obtained by reducing the original image, and for performing the Retinex process on the original image based on this clipped range. This reduced Retinex process will be described later with reference to FIGS. 5 through 8. While the reduced Retinex process produces an image of slightly lower quality than that produced in the normal Retinex process, the processing speed is faster.

Next, the normal Retinex process will be described with reference to FIG. 3. FIG. 3 is a flowchart illustrating steps in the normal Retinex process.

In S11, the CPU 11 reads pixel values for all pixels in the original image from the PC 2 or the digital camera 21, and stores these pixel values in the image data memory 13c1. In S12 the CPU 11 converts each pixel for the original image to the luma component Y and color components Cb and Cr. The luma component Y and color components Cb and Cr are calculated according to the following equation 1.

$$\begin{pmatrix} Y \\ Cb \\ Cr \end{pmatrix} = \begin{pmatrix} 0.30 & 0.59 & 0.11 \\ -0.17 & -0.34 & 0.51 \\ 0.51 & -0.43 & -0.08 \end{pmatrix} \begin{pmatrix} R \\ G \\ B \end{pmatrix} \quad \text{Equation 1}$$

The CPU 11 stores the luminance signal Y and color signals Cb and Cr calculated above in the image data memory 13c1. In S13, the CPU 11 calculates a reflectance R (x, y) from the luminance signal Y calculated above for one pixel at a location (x, y) in the reduced image, wherein x is the horizontal coordinate and y is the vertical coordinate. The reflectance R is calculated according to the following equation 2.

$$R(x, y) = \log \frac{Y(x, y)}{F(x, y) * Y(x, y)} \quad \text{Equation 2}$$

Here, Y(x, y) is the intensity of the luminance signal at the coordinate (x, y), F(x, y) is a filter coefficient of the coordinate (x, y), and "*" is the convolution operator. Further, log is the natural logarithm to the base e.

In S14, the CPU 11 stores the reflectance R (x, y) found in the above calculations in the reflectance memory 13c2 of the RAM 13. In S15, the CPU 11 finds maximum and minimum values of reflectance R (x, y) values obtained thus far.

Specifically, the maximum and minimum values are both set to the reflectance R (x, y) found for the first coordinates. All reflectance R (x, y) values subsequently obtained are compared with the current maximum and minimum values. If the current reflectance R (x, y) is greater than the maximum value, then this reflectance R (x, y) is set as the new maximum value. Similarly, if the current reflectance R (x, y) is less than the minimum value, then this reflectance R (x, y) is set as the new minimum value. When the current reflectance R (x, y) is less than the maximum value and greater than the minimum value, the maximum and minimum values remain unchanged.

In S16, the CPU 11 determines whether the process in S13-S15 has been completed for all coordinates in the image. If unprocessed coordinates remain (S16: NO), the CPU 11 returns to S13. However, if the process has been completed for all coordinates (S16: YES), then in S17 the CPU 11 normalizes the reflectance R (x, y) values stored in the reflectance memory 13c2 based on the maximum and minimum values obtained in S15 to form a histogram. This histogram is a tabulation of the numbers of pixel values for integer values between calculated maximum and minimum values and is formed in the histogram memory 13c3.

In S18, the CPU 11 finds a median value N from the histogram formed in S17 and in S19 sets a clipped range of reflectance R (x, y) values (normalization parameters) based on the median value M and the histogram.

Figure 4:
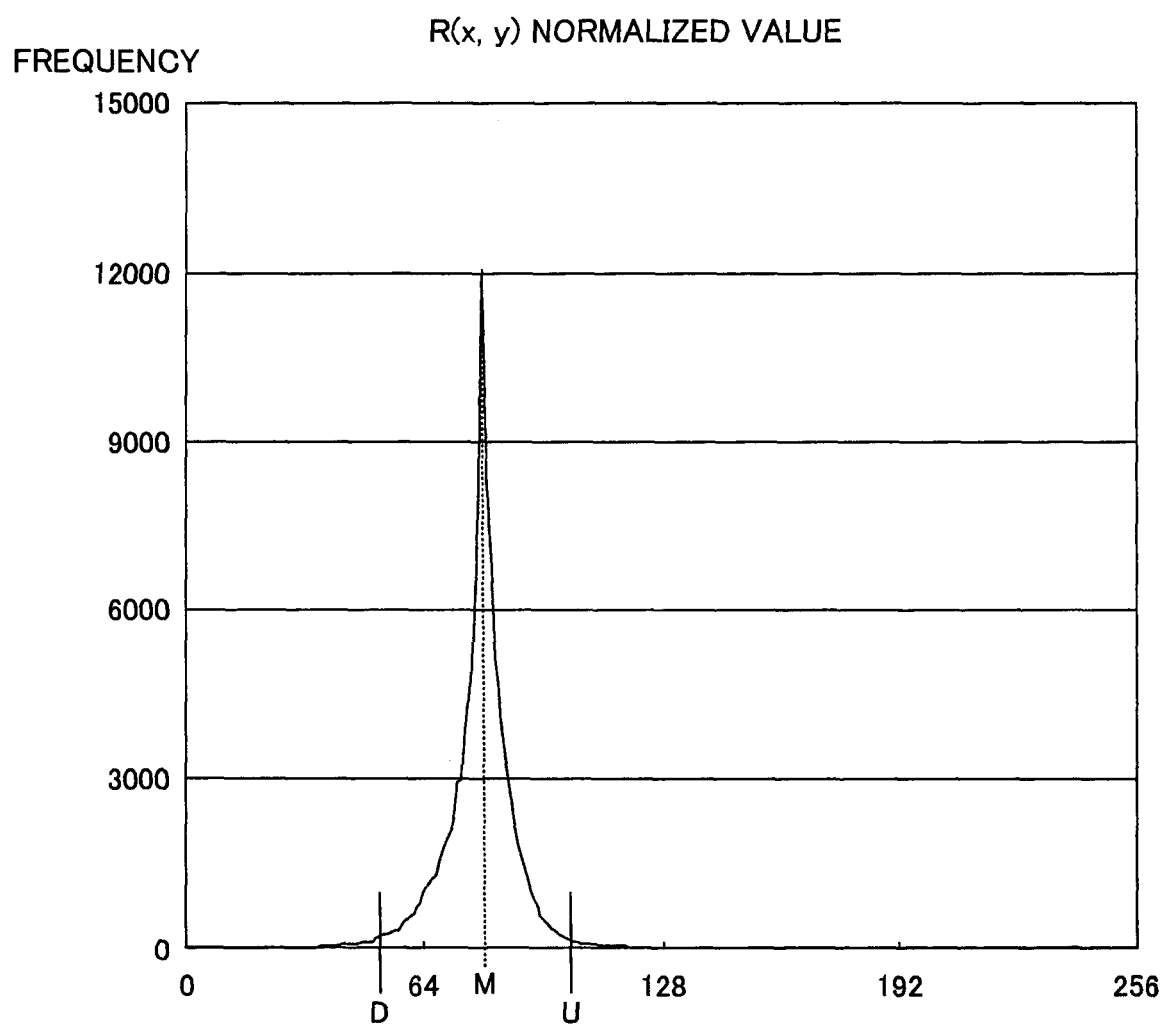
FIG. 4 is a graph conceptually illustrating a clipped range for performing normalization.

FIG. 4 is a histogram in which the reflectance R (x, y) found in the equation 2 for all coordinates is normalized to be mapped on a scale of 256 levels with a minimum value of 0 and a maximum value of 255. Specifically, the normalization is achieved through a process of setting the minimum reflectance R (x, y) among all coordinates to 0 and the maximum value to 255 and linearly setting all reflectance R (x, y) values for other coordinates to integers between 0 and 255. The histogram is formed in the histogram memory 13c3 by tabulating the frequency of pixels indicating each computed value between the maximum and minimum values.

From this histogram, a median value N is found. An upper value U and a lower value D are set based on the median value N so that a 45% portion of all the pixels have values falling in a range from the median value M to the upper value U and so that another 45% portion of all the pixels have values falling in a range from the lower value D to the median value M. This ensures that a 5% portion of all the pixels have values greater than the upper value U, and another 5% portion of all the pixels have values smaller than the lower value D. A reflectance R(x, y) corresponding to the upper value U is set as an upper limit reflectance value UpR, and a reflectance R(x, y) corresponding to the lower value D is set as a lower limit reflectance value DownR. The upper limit reflectance value UpR and lower limit reflectance value DownR determine the upper and lower limits of a clipped range, respectively, and are set as the normalization parameters.

In S20, the CPU 11 normalizes the R(x, y) stored in the reflectance memory 13c2 based on the clipped range acquired in the above process to acquire a normalized reflectance value refle(x, y).

The CPU 11 finds the reflectance value refle (x, y) using the following equation 3.

$$refle(x, y) = \frac{R(x, y) - DownR}{UpR - DownR} \quad \text{Equation 3}$$

In S21 the CPU 11 uses this reflectance value refle (x, y) to acquire a pixel value Out(x, y) for a luminance value on which the Retinex process was performed according to the following equation 4, where γ is a constant. In equation 4, Y(x, y)/refle(x, y) corresponds to the normalized Retinex value.

$$Yout(x, y) = \frac{Y(x, y)}{\left(\frac{Y(x, y)}{255 \times refle(x, y)}\right)^{(1-1/\gamma)}} \quad \text{Equation 4}$$

In S22, the CPU 11 converts the Retinex-corrected luminance value Yout(x, y) and the color signals Cb and Cr obtained in S12 to RGB values, using the following equation 5, and outputs the acquired pixel values. The CPU 11 outputs the acquired pixel values to the printing unit 15 when the printing unit 15 is set as the output destination.

$$\begin{pmatrix} R \\ G \\ B \end{pmatrix} = \begin{pmatrix} 1.0 & 0 & 1.37 \\ 1.0 & -0.34 & -0.70 \\ 1.0 & 1.73 & 0 \end{pmatrix} \begin{pmatrix} Yout \\ Cb \\ Cr \end{pmatrix} \quad \text{Equation 5}$$

In S23 the CPU 11 determines whether all pixels in the original image have been processed. If unprocessed pixels remain (S23: NO), then the CPU 11 returns to S20. However, if all pixels have been processed (S23: YES), then the CPU 11 ends the Retinex process.

Next, the reduced Retinex process will be described with reference to FIGS. 5 through 8. The reduced Retinex process starts when the CPU 11 determines whether the memory amount required for a normal Retinex process is greater than the allocated memory amount in S4 of FIG. 2.

Figure 5:
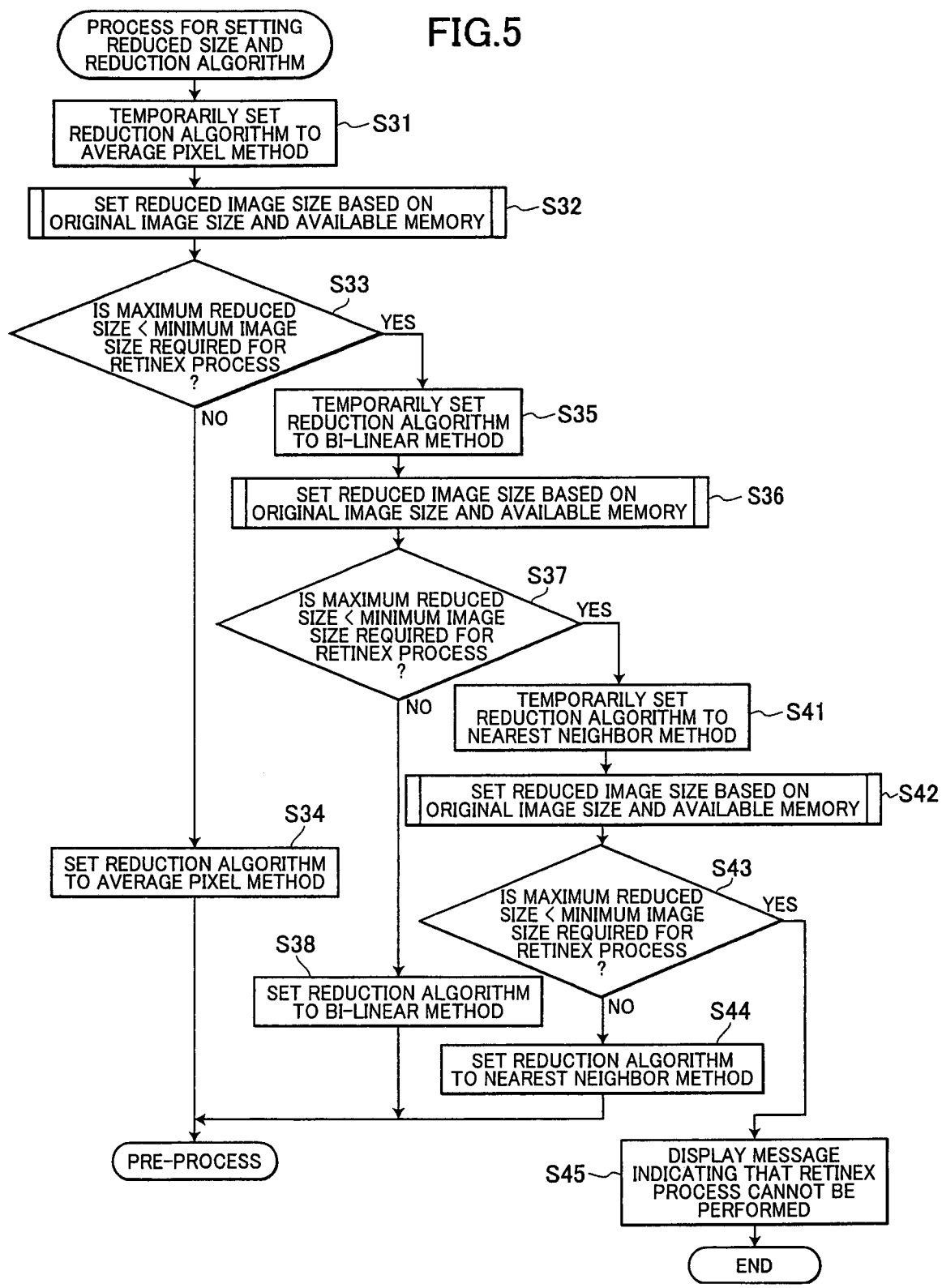
FIG. 5 is a flowchart illustrating steps in a Retinex process performed after reducing the original image.
Figure 6:
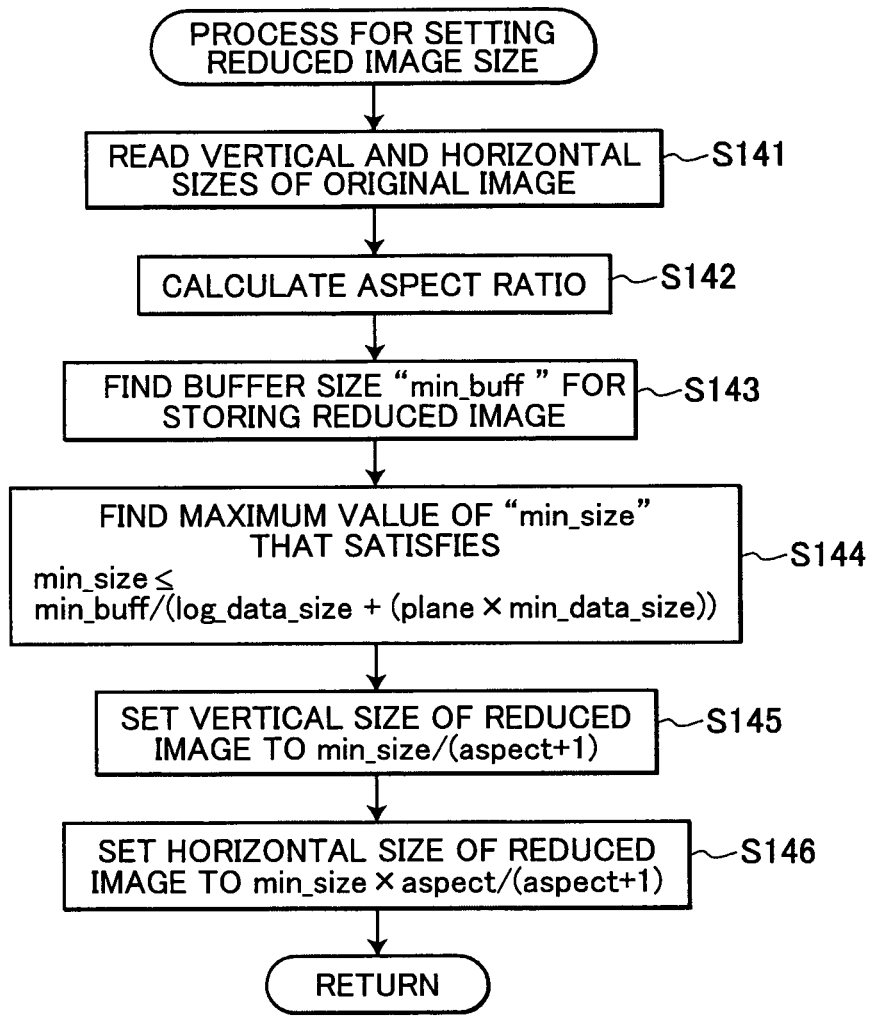
FIG. 6 is a flowchart illustrating steps in a process for determining the size of a reduced image.
Figure 7:
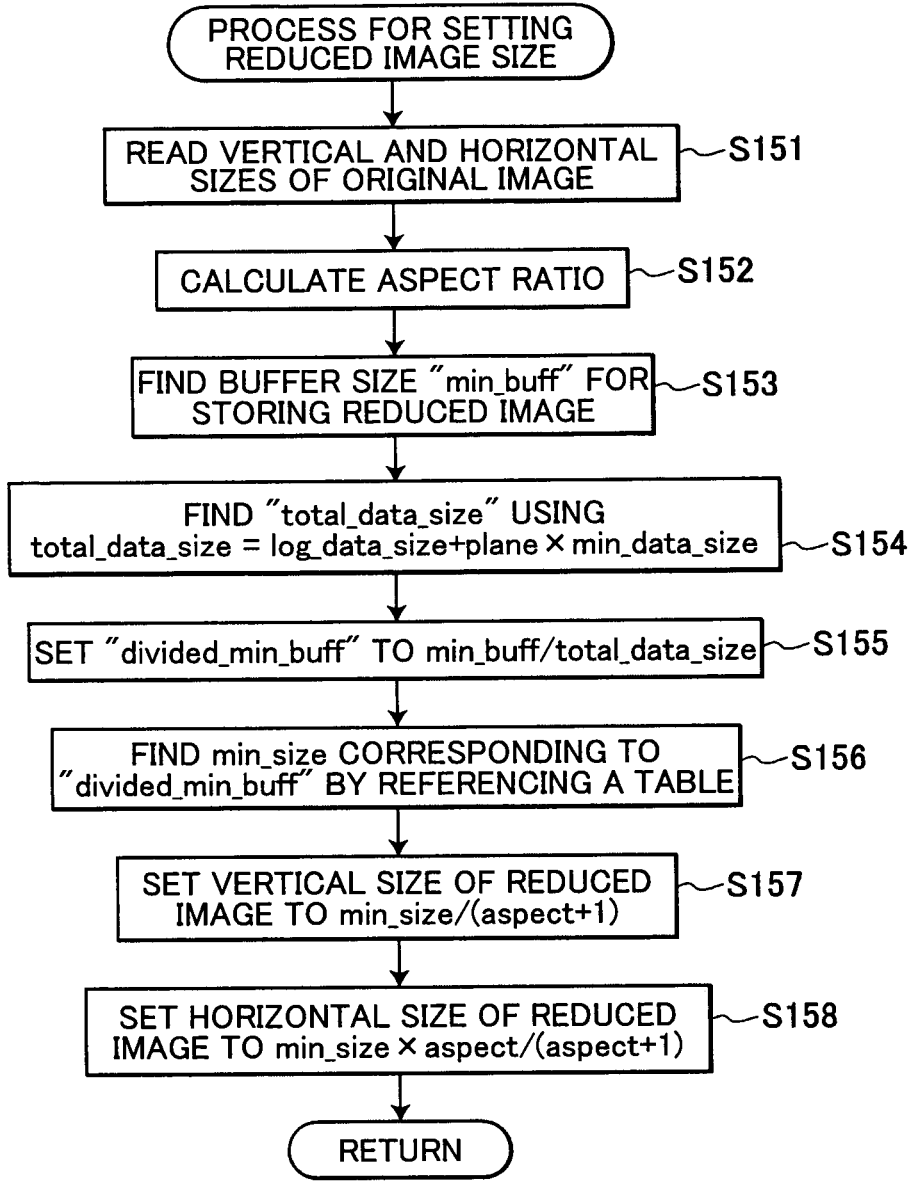
FIG. 7 is a flowchart illustrating steps in a process for determining the size of the reduced image by referencing a table.
Figure 8:
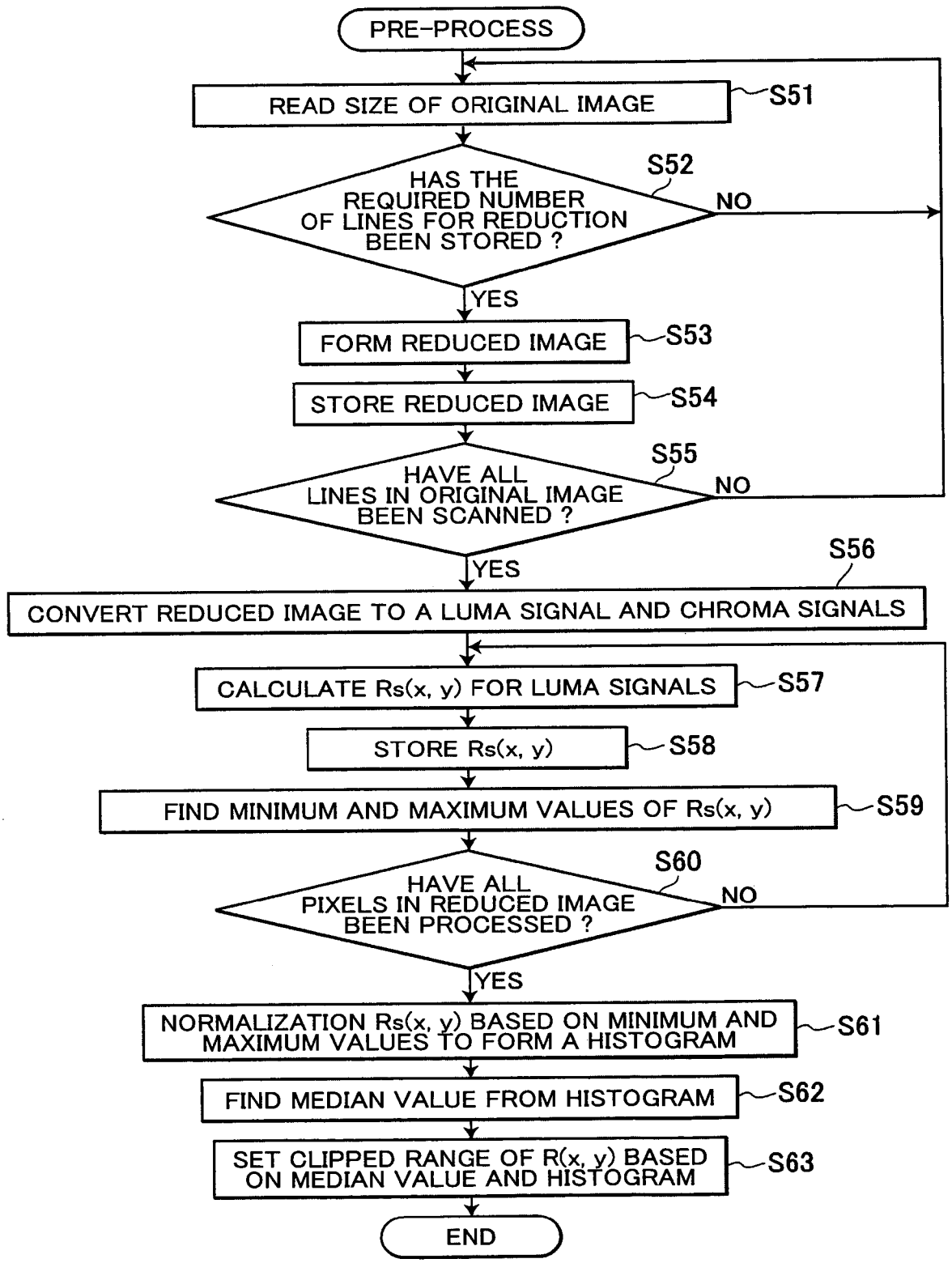
FIG. 8 is a flowchart illustrating steps in a pre-process of the reduced image process.

The process shown in the flowchart of FIG. 5 sets a reduced image size and a reduction algorithm for the reduced Retinex process. The flowcharts in FIGS. 6 and 7 illustrate steps in a process for setting a reduced size. The flowchart in FIG. 8 illustrates steps in the reduced Retinex process performed according to the reduced image size and reduction algorithm set above.

In S31 of FIG. 5, the CPU 11 temporarily sets the reduction algorithm to the average pixel method. In S32 the CPU 11 performs a subroutine for obtaining, based on the size of the original image stored in the temporary memory 13a in S1 of FIG. 2 and the allocated memory amount of the image processing memory stored in the temporary memory 13a in S2 of FIG. 2, a maximum reduced size of an image reduced according to the average pixel method for performing a Retinex process. The subroutine for setting this reduced size will be described later with reference to FIGS. 6 and 7.

In S33 the CPU 11 determines whether the maximum reduced size is smaller than the minimum image size for performing the Retinex process.

If the maximum reduced size is not smaller than the minimum image size for performing the Retinex process (S33: NO), then in S34 the CPU 11 stores this maximum reduced size in the temporary memory 13a together with the average pixel method as the reduction algorithm.

However, if the maximum reduced size is smaller than the minimum image size for performing the Retinex process (S33: YES), then in S35 the CPU 11 temporarily sets the reduction algorithm to the bi-linear method. In S36 the CPU 11 performs a subroutine for obtaining, based on the size of the original image stored in the temporary memory 13a in S1 of FIG. 2 and the allocated memory amount of the image processing memory stored in the temporary memory 13a in S2 of FIG. 2, a maximum reduced size of an image reduced according to the bi-linear method for performing the Retinex process. This subroutine will be described later with reference to FIGS. 6 and 7.

In S37 the CPU 11 determines whether the maximum reduced size is smaller than the minimum image size for performing the Retinex process. If the maximum reduced size is not smaller than this minimum image size for performing the Retinex process (S37: NO), then in S38 the CPU 11 stores this maximum reduced size in the temporary memory 13a together with the bi-linear method as the reduction algorithm.

However, if the maximum reduced size is smaller than the minimum image size for performing the Retinex process (S37: YES), then in S41 the CPU 11 temporarily sets the reduction algorithm to the nearest neighbor method. In S42 the CPU 11 performs a subroutine for obtaining, based on the size of the original image stored in the temporary memory 13a in S1 of FIG. 2 and the allocated memory amount of the image processing memory stored in the temporary memory 13a in S2 of FIG. 2, a maximum reduced size of an image reduced according to the nearest neighbor method for performing the Retinex process. This subroutine is described later with reference to FIGS. 6 and 7.

In S43 the CPU 11 determines whether the maximum reduced size is smaller than the minimum reduced size for performing the Retinex process. If the maximum reduced size is not smaller than the minimum image size for performing the Retinex process (S43: NO), then in S44 the CPU 11 stores this maximum reduced size in the temporary memory 13a together with the nearest neighbor method as the reduction algorithm.

However, if the maximum reduced size is smaller than the minimum image size for performing the Retinex process (S43: YES), indicating that the Retinex process cannot be performed by reducing the original image, in S45 the CPU 11 displays a message indicating that the Retinex process cannot be performed on a display unit of the control panel 16, and subsequently ends the process for setting the reduced image size and the reduction algorithm. When the reduced size and the reduction algorithm are set in one of the processes of S34, S38, or S44, the CPU 11 advances to the pre-process shown in the flowchart of FIG. 8 described later.

Next, the subroutine for obtaining the maximum reduced size will be described with reference to FIG. 6. In this subroutine, the printer 1 calculates, based on the size of the original image stored in the temporary memory 13a in S1 of FIG. 2 and the allocated memory amount of the image processing memory stored in the temporary memory 13a in S2 of FIG. 2, the maximum reduced size of a reduce image when reducing the image according to the reduction algorithm temporarily set in the S31, S35, or S41 of FIG. 5 for performing the Retinex process.

In S141 of FIG. 6 the CPU 11 reads the vertical and horizontal sizes of the original image from the temporary memory 13a, and in S142 calculates the aspect ratio (horizontal-to-vertical ratio). The aspect ratio aspect is a value obtained by dividing the number of pixels in the horizontal direction by the number of pixels in the vertical direction.

In S143 the CPU 11 finds "min_buff" indicating a buffer size for storing the reduced image. "min_buff" is calculated by subtracting the memory used for performing the reduction process described in FIG. 8 and the like from the memory allocated in the process of S2 in FIG. 2. Since the memory used for performing the reduction process varies according to the type of reduction algorithm, "min_buff" also varies according to the type of reduction algorithm.

In S144 the CPU 11 finds "min_size" indicating the size of the reduced image. Specifically, the CPU 11 finds the maximum value of "min_size" that satisfies the following expression 6.

$$\text{min\_size} \leq \frac{\text{min\_buff}}{\text{log\_data\_size} + (\text{plane} \times \text{min\_data\_size})} \quad \text{Expression 6}$$

In expression 6, "min_data_siza" indicates the data size of the reduced image for one pixel, "log_data_size" indicates the data size of reflectance value for the pixel, and "plane" indicates the number of planes in the original image. In the preferred embodiment, "plane" is three, since RGB values are converted and stored as the luma component Y and the color components Cb and Cr.

In S145 the CPU 11 finds the vertical size of the reduced image from "min_buff" according to the calculation "min_size"/(aspect+1), and in S146 finds the horizontal size of the reduced image according to the calculation "min_size"×aspect/(aspect+1).

Through the above calculations, the printer 1 can obtain the reduced image size. Another method for finding the reduced image size modifies part of the process in FIG. 6 to a process for referencing a table. FIG. 7 is a flowchart illustrating steps in a process for obtaining the reduced image size by referencing a table.

In S151 of the process in FIG. 7, the CPU 11 reads the vertical and horizontal sizes of the original image from the temporary memory 13a and in S152 calculates the aspect ratio. In S153 the CPU 11 finds "min_buff" indicating a buffer size for storing the reduced image.

In S154 the CPU 11 finds "total_data_size" indicating the total amount of data per pixel, using the following equation 7.

$$\text{total\_data\_size} = \text{log\_data\_size} + \text{plane} \times \text{min\_data\_size} \quad \text{Equation 7}$$

In S155 the CPU 11 calculates "divided_min_buff" indicating the amount of data that the buffer for storing the reduced image can store, by dividing "min_buff" by "total_data_size".

In S156 the CPU 11 references a table based on the calculated "divided_min_buff" and reads "min_size" corresponding to "divided_min_buff".

Table 1 is the table referenced in S156, and includes values of "min_size" in association with values of "divided_min_buff". In Table 1, values for "divided_min_buff" are stored in units of kilobytes, while values for "min_size" are stored in units of pixels. Since the minimum value of "divided_min_buff" is 251, the Retinex process cannot be performed for values lower than 251,

TABLE 1

| Divided_min_buff(KB) | Min_size(pixel) |
|---|---|
| 20,000-15,0001 | 15,000 |
| 15,000-10,0001 | 10,000 |
| 10,000-7,501 | 7,500 |
| 7,500-5,001 | 5,000 |
| 5,000-3,001 | 3,000 |
| 3,000-2,001 | 2,000 |
| 2,000-1,501 | 1,500 |
| 1,500-1,001 | 1,000 |
| 1,000-501 | 500 |
| 500-251 | 250 |

In S157 the CPU 11 finds the vertical size of the reduced image from "min_buff" set above according to the calculation min_size/(aspect+1), and in S158 finds the horizontal size of the reduced image from the calculation min_size×aspect/(aspect+1).

The reduced image size can be determined according to either of the methods described with reference to FIGS. 6 and 7.

Next, a pre-process in the reduced Retinex process will be described with reference to the flowchart in FIG. 8. The pre-process includes a reduced image forming step and a clipped range finding step.

At the beginning of the pre-process, in S51 the CPU 11 reads the original image one line at a time from the PC 2 or the like storing the original image, and stores this image data in the image data memory 13c1. Note that image data captured by a digital camera or the like is compressed according to a compression method such as JPEG and stored sequentially in horizontal lines of pixels for a rectangular image.

In S52 the CPU 11 determines whether the number of lines of image data stored in the image data memory 13c1 is sufficient for performing reduction with the reduction algorithm stored in the temporary memory 13a. The required number of lines for performing reduction is one line if the reduction algorithm is the nearest neighbor method, two lines if the bi-linear method, and a value obtained by dividing the original image size by the reduced image size (an inverse of a reduction ration) if the average pixel method.

If the number of lines stored in the image data memory 13c1 is insufficient for reduction (S52: NO), the CPU 11 returns to S51. When the number of lines is sufficient for reduction (S52: YES), then in S53 the CPU 11 forms a reduced image based on the reduction algorithm and in S54 stores this reduced image in a reduced image memory area (not shown) of the image data memory 13c1. After forming the reduced image, the CPU 11 overwrites data currently stored in the image data memory 13c1 with subsequent lines of data read for the original image, thereby reducing the required storage capacity of the image data memory 13c1.

In S55 the CPU 11 determines whether all lines in the original image have been scanned to form the reduced image. If unprocessed lines remain (S55: NO), the CPU 11 returns to S51. However, if all lines have been processed (S55: YES), then in S56 the CPU 11 converts each pixel in the reduced image to a luminance component Y and color components Cb and Cr. The luminance component Y and the color components Cb and Cr are calculated from the RGB values of the reduced image based on the equation 1.

The luminance signal Y and color signals Cb and Cr calculated above may be temporarily stored in the temporary memory 13a or the like to be used in subsequent processes. However, if it is desirable to reduce the storage volume, these values may be calculated in the above equation 1 by reading pixel values from the original image as needed without storing the values in memory.

In S57, the CPU 11 calculates a reflectance Rs (x, y) from the luminance signal Y calculated above for one pixel at a location (x, y) in the reduced image, using the following equation 8, wherein "x" is the horizontal coordinate, "y" is the vertical coordinate, and "s" is added to the end of symbols for indicating the reduced image as opposed to the original image.

$$Rs(x, y) = \log \frac{Ys(x, y)}{Fs(x, y) * Ys(x, y)} \quad \text{Equation 8}$$

Here, Ys(x, y) is the intensity of the luminance signal at the coordinate (x, y), Fs(x, y) is a filter coefficient of the coordinate (x, y), and "*" is the convolution operator. Further, log is the natural logarithm to the base e.

In S58, the CPU 11 stores the reflectance Rs (x, y) found in the above calculations in the reflectance memory 13c2 of the RAM 13. In S59 the CPU 11 compares the reflectance Rs (x, y) to maximum and minimum values of reflectance Rs (x, y) values obtained thus far.

In S60, the CPU 11 determines whether the process in S57-S59 has been completed for all coordinates in the reduced image. If unprocessed coordinates remain (S560: NO), the CPU 11 returns to S57. However, if the process has been completed for all coordinates (S60: YES), then in S61 the CPU 11 normalizes the reflectance Rs (x, y) values based on the maximum and minimum values obtained in S59 to form a histogram in the histogram memory 13c3.

In S62 the CPU 11 finds a median value M from the histogram formed in S59 as S18 of FIG. 3, and in S63 sets a clipped range of reflectance Rs (x, y) values (normalization parameters) based on the median value M and the histogram as S19 of FIG. 3.

The following table shows the difference between a clipped range (upper limit UpR and lower limit DownR) found based on the reduced image, and a clipped range found based on the original image by experiments.

TABLE 2

|  | Clipped range | | Maximum/Minimum values | |
|---|---|---|---|---|
|  | Upper limit | Lower limit | Maximum value | Minimum value |
| Original image | 0.825 | −0.822 | 2.712 | −4.063 |
| Reduced image | 0.742 | −0.755 | 1.729 | −2.607 |
| Difference | 0.083 | 0.067 | 0.983 | 1.456 |

As shown in this table, the maximum value of reflectance values R(x, y) for the original image is 2.712, and the minimum value −4.063, while the maximum value of reflectance values Rs(x, y) for the reduced image is 1.729, and the minimum value −2.607. Hence, the difference between the maximum reflectance for the original image and the maximum reflectance for the reduced image is 0.983, and the difference between the minimum reflectance for the original image and the minimum reflectance for the reduced image is 1.456. These differences are considerably large.

However, the upper limit of the clipped range found based on the reflectance values of the original image is 0.825 and the lower limit −0.822, while the upper limit found based on the reflectance values of the reduced image is 0.742 and the lower limit −0.755. Hence, the difference between the upper limit of the clipped range for the reflectance values for the original image and the upper limit of the clipped range for the reflectance values for the reduced image is 0.083, while the difference between the lower limit of the clipped range for the reflectance values for the original image and the lower limit of the clipped range for the reflectance values for the reduced image is 0.067. These differences are small.

Since there is no great difference between the clipped range found based on the reduced image and the clipped range found based on the original image, the clipped range found based on the reduced image can be applied to the original image.

In this way, the printer 1 of the embodiment uses the clipped range found in the pre-process based on reflectance values of the reduced image to find a clipped range for normalizing reflectance values in the original image. Through this process, the printer 1 can find the clipped range in fewer operations than the number of operations required to find the clipped range for the original image, thereby improving processing speed. Further, since the reduced image having fewer pixels than the original image is stored in the image data memory 13c1, the storage capacity need not be as large as when storing the original image.

Figure 9:
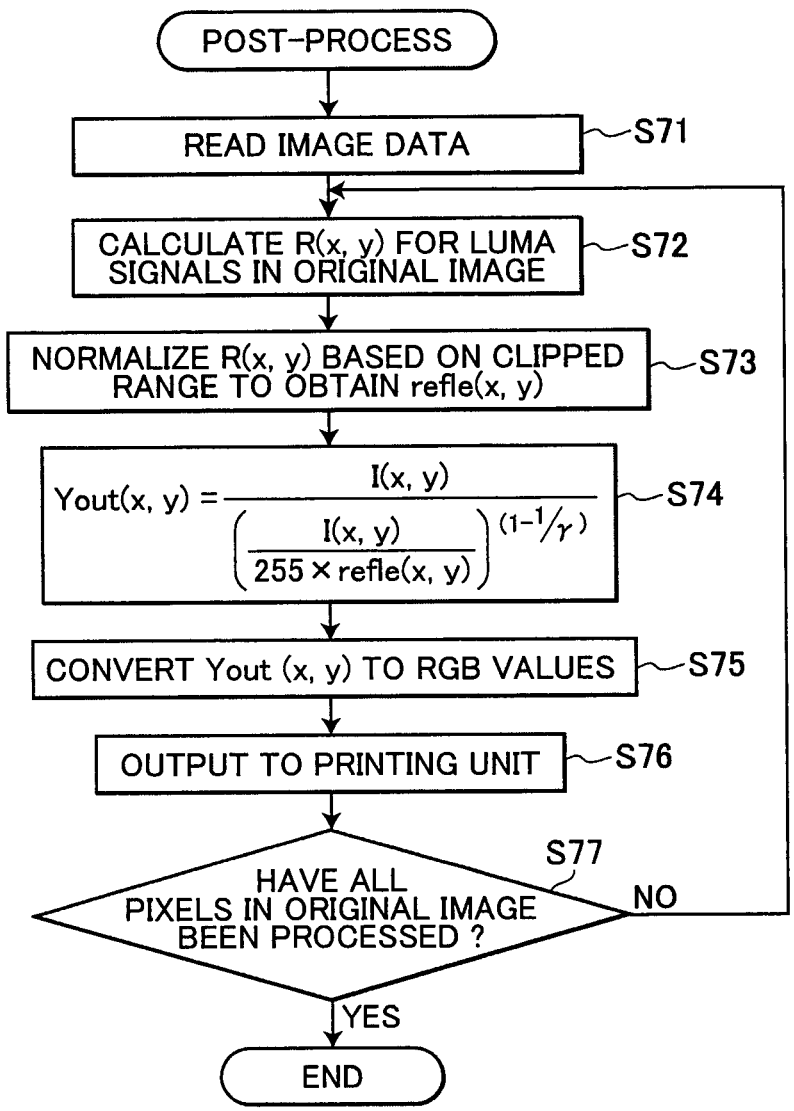
FIG. 9 is a flowchart illustrating steps in a post-process of the reduced image process.

Next, a post-process performed based on the clipped range found in the pre-process will be described with reference to FIG. 9. The post-process is a Retinex process performed on the original image. FIG. 9 is a flowchart illustrating steps in this Retinex process. The post-process is performed on each pixel in the original image and sequentially outputs processed pixel values (RGB values) to the printing unit 15.

In S71 of FIG. 9 the CPU 11 reads image data for the original image of a number of lines required in the mask process for calculating the reflectance value R(x, y), finds the luma component Y, and stores the luma component Y in the image data memory 13c1. In S72 the CPU 11 finds the reflectance value R(x, y) using the luma component Y stored in the image data memory 13c1 and the filter coefficient. In S73 the CPU 11 normalizes the reflectance value R(x, y) based on the clipped range found using the reduced image in FIG. 8 to acquire the reflectance value refle (x, y).

In S74 the CPU 11 performs the Retinex process on luminance using refle(x, y) in the equation 4 to obtain a Retinex-corrected luminance value Yout(x, y) (luminance signal Y). In S75 the CPU 11 converts the Retinex-corrected luminance value Yout(x, y) and the color signals Cb and Cr to RGB values, using the equation 5.

In the process described above, the CPU 11 executes the Retinex process on a luminance signal for the original image and finds pixel values by converting the Retinex-processed luminance signal and the color signals back to RGB values.

In S76 the CPU 11 outputs the processed pixel values to the printing unit 15. Hence, by identifying the clipped range for performing normalization in the pre-process, the CPU 11 can sequentially process each pixel and output the results to the printing unit 15 in the post-process, thereby reducing the time from the start of image processing to the start of the printing operation.

As described above in the first embodiment, the Retinex process is performed after reducing the original image when the allocated memory amount is Less than the memory amount required for storing the entire original image in the RAM 13.

When reducing the original image, the printer 1 first finds the maximum size of a reduced image feasible for processing with the available memory while the reduction algorithm is set to the average pixel method, and reduces the original image according to the average pixel method when the size of the maximum reduced image is greater than the minimum size for performing the Retinex process. However, if the Retinex process cannot be performed when reducing the original image according to the average pixel method, the printer 1 next determines the maximum size of the reduced image when the reduction algorithm is set to the bi-linear method and performs the Retinex process after reduction according to the bi-linear method when use of the bi-linear method is feasible.

If the process cannot be performed using the bi-linear method, then the printer 1 next determines the maximum size of the reduced image using the nearest neighbor method, and performs the Retinex process after reducing the original image according to the nearest neighbor method when the process is feasible with this method. If the process cannot be performed using the nearest neighbor method, the printer 1 displays a message to the user indicating that the Retinex process cannot be performed.

When performing the Retinex process, the best image quality can be achieved by storing all pixels in the original image. When reducing the original image for the Retinex process, the next best image quality can be achieved when reduction is performed using the average pixel method and the image quality declines in order with the bi-linear method and the nearest neighbor method. However, the greater the image quality, the larger the number of pixels being processed, requiring a greater number of calculations and more processing time. Hence, the method of the Retinex process described in the first embodiment is selected to emphasize image quality.

Next, a second embodiment of the present invention will be described. In the second embodiment, the user sets parameters when printing an image, and the printer 1 determines whether the user wishes to emphasize image quality or processing speed based on the printing parameters. The printer 1 sets the method for performing the Retinex process based on the amount of available memory and the priority of image quality or processing speed. The printer 1 according to the second embodiment uses the same circuit structure as that in the first embodiment described above and only differs from the first embodiment in the processing method. Hence, only a process that differs from the first embodiment will be described below.

First, printing parameters set by the user will be described. The user sets the printing parameters in a window displayed on the PC 2 connected to the printer 1. The printing parameters are transmitted to the printer 1 via the interface 17 and stored in the print function memory 13*b*.

Figure 10:
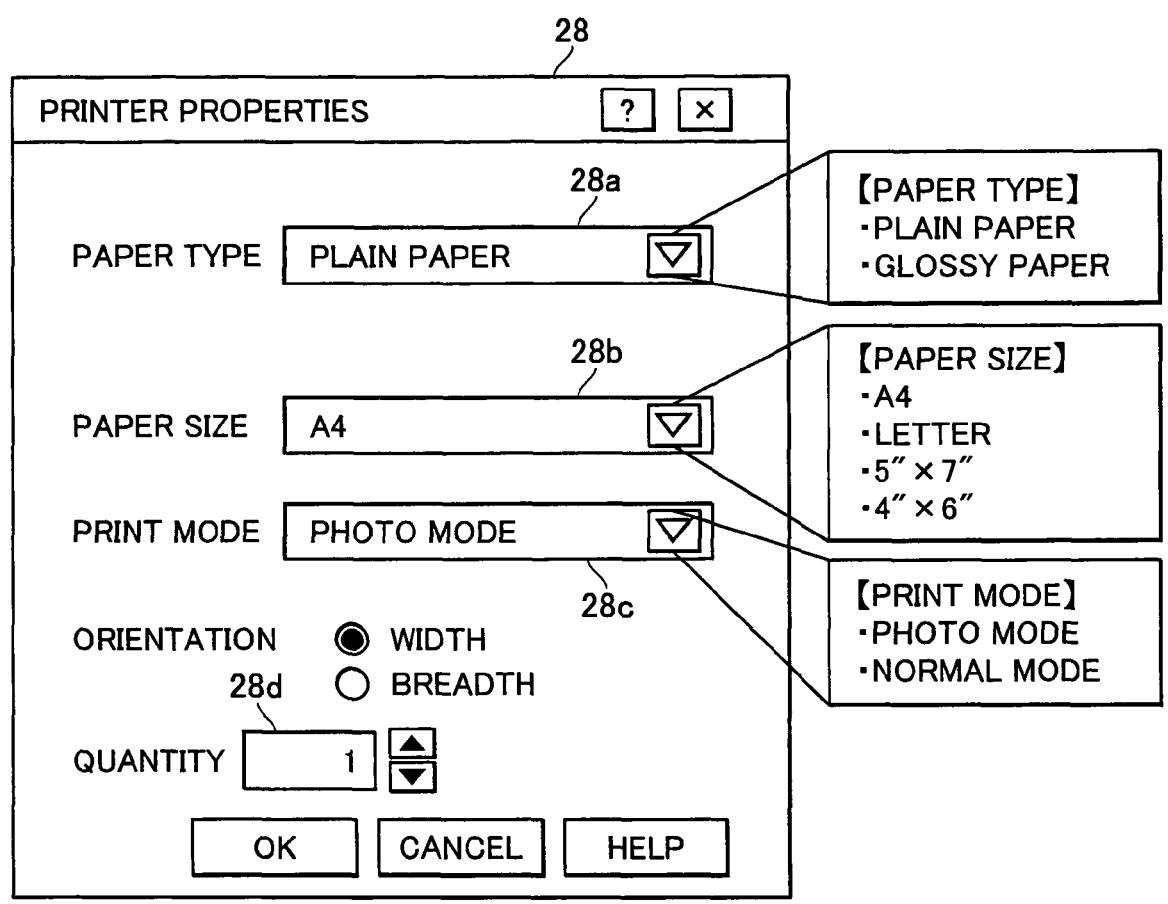
FIG. 10 is an explanatory diagram illustrating a window for setting printing parameters according to a second embodiment.

FIG. 10 shows a printing parameter setting window 28 displayed on a display unit of the PC 2 when the user selects an option to set the printing parameters. The printing parameter setting window 28 includes a paper type selection box 28*a* for selecting a type of printing paper for the printing process, a paper size setting box 28*b* for setting the size of the paper, a print mode setting box 28*c* for setting the print mode, and a quantity setting box 28*d* for setting the quantity to be printed.

The paper type selection box 28*a* has a display area for displaying the selected paper type, and a downward-pointing triangular-shaped icon positioned in the right end of this display area. The user can display the pull-down menu shown in FIG. 10 by operating the mouse to align a cursor with the icon and performing a mouse click. By further aligning the cursor with an item in the subsequently displayed pull-down menu and clicking a button on the mouse, the user can select the item indicated by the cursor.

In the embodiment, the user can select plain paper or glossy paper as the paper type. Plain paper is currently selected in the example of FIG. 10.

Similarly, the paper size setting box 28*b* has an area displaying the selected paper size, and an icon indicating a pull-down menu for selecting a paper size. The user can select one of A4, letter, 5"×7", and 4"×6" as the paper size.

The print mode setting box 28*c* also has an area displaying the selected print mode, and an icon indicating a pull-down menu for selecting a print mode. The user can select either the photo mode or the normal mode as the print mode. The photo mode is used for printing in a higher quality than in the normal mode at a higher resolution. For example, the resolution in the photo mode is 1200×1200 dpi, while the lower resolution in the normal mode is 600×600 dpi. When the printer 1 is of an inkjet type, the printer 1 may be configured to use different droplet sizes and different types of ink based on the resolution.

The quantity setting box 28*d* is configured of an area for displaying the quantity to be printed. To the right of this area are provided an upward-pointing triangular-shaped incrementing icon for increasing the quantity, and a downward-pointing triangular-shaped decrementing icon for decreasing the quantity. The user can set the printing quantity by aligning the cursor with these icons and clicking the mouse.

In addition to the icons described above, the printing parameter setting window 28 also includes radio buttons for setting the orientation of the image printed on the paper, an OK button for making the settings effective while closing the settings window, a Cancel button for closing the settings window without making the settings effective, and a Help button for displaying a window with an explanation of the settings.

Figure 11:
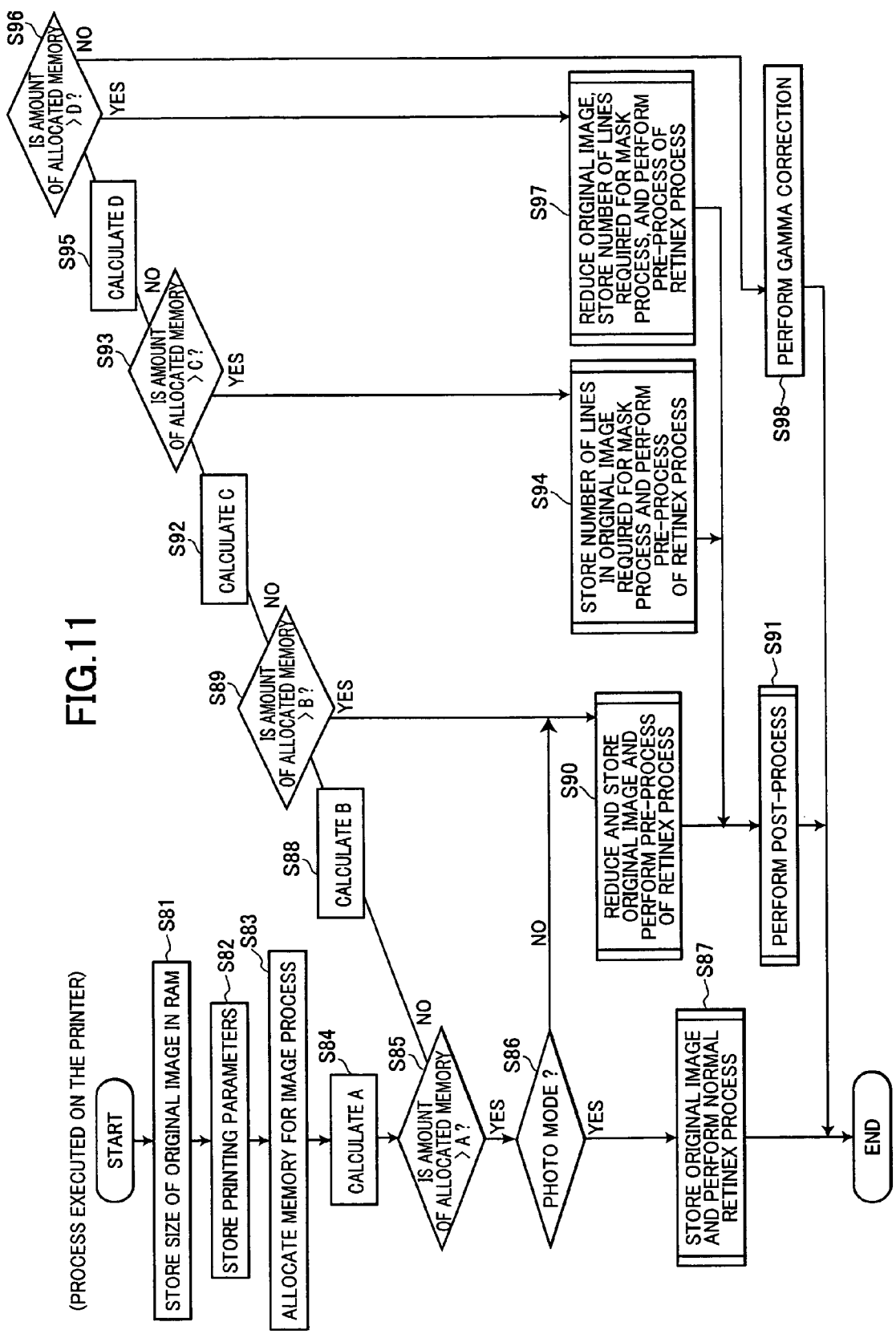
FIG. 11 is a flowchart illustrating the general steps in an image process according to the second embodiment.

Next, an image process executed by the CPU 11 will be described with reference to FIG. 11. FIG. 11 is a flowchart illustrating steps in the main process of the image process. In this main process, the CPU 11 determines the method of image processing based on the size of the original image being processed, and the size of the region of the image processing memory 13*c* currently available in the RAM 13 for allocation, and subsequently performs the image process according to the selected method.

In S81 of FIG. 11 the CPU 11 reads the size of the original image specified by the user for image processing and stores this size in the temporary memory 13*a*. The size of the original image is data stored in a header or the like of image data taken by the digital camera, for example.

In S82 the CPU 11 stores printing parameters set on the PC 2 in the print function memory 13*b*. In S83 the CPU 11 allocates the image processing memory 13*c* for image processing based on the current usage conditions of the printer 1 and stores data indicating the amount of allocated memory in the temporary memory 13*a*.

Next, the CPU 11 determines the method of image processing based on the amount of allocated memory. The printer 1 achieves this by comparing the amount of available memory to reference memory amounts A, B, C, and D given in order from largest to smallest.

The reference memory amounts A, B, C and D are values set based on the size of the original image and indicate the amount of memory required for performing various methods. Specifically, the memory amount A is a memory amount sufficient for storing the original image to be processed and the reflectance values found for all pixels in the original image, and performing the Retinex process. The memory amount B is a memory amount sufficient for storing the reduced image to be processed and the reflectance values found for all pixels in the reduce image, and performing the Retinex process. The memory amount C is a memory amount sufficient for storing the number of lines required for masking the original image and the reflectance values found for all pixels in the required lines, and performing the Retinex process. The memory amount D is a memory amount sufficient for storing the number of lines required for masking the reduced image and the reflectance values found for all pixels in the required lines, and performing the Retinex process.

In S84 the CPU calculates the memory amount A. The process in S84 is identical to S11-S16 of FIG. 3 and, thus, a description of that process will not be repeated here. Then in S85 the CPU 11 determines whether the amount of allocated memory is greater than the amount A. If the amount of allocated memory is greater than the memory amount A (S85:

YES), then in S86 the CPU 11 determines whether the print mode stored in the print function memory 13b is set to the photo mode.

If the print mode is set to the photo mode (S86: YES), then in S87 the CPU 11 stores all pixels in the original image in the image data memory 13c1 and performs the Retinex process. The process in S87 is identical to the process of the first embodiment described in the flowchart of FIG. 5 and, thus, a description of that process will not be repeated here.

However, if the print mode is set to the normal mode (S86: NO), then in S90 the CPU 11 reduces the original image and stores the reduced image in the image data memory 13c1 to perform the pre-process of the Retinex process. The pre-process of S90 will be described later with reference to the tables in FIGS. 12 and 13.

The photo mode emphasizes image quality over processing speed. Therefore, if the photo mode is set, the printer 1 performs the normal Retinex process to achieve the highest image quality. On the other hand, the normal mode emphases processing speed over image quality. Therefore, if the normal mode is set, the printer 1 performs the reduced Retinex process to higher processing speed.

If the amount of allocated memory is not greater than the memory amount A (S85: NO), in S88 the CPU 11 calculates the memory amount B. The process in S88 is identical to S11-S16 of FIG. 3 adapted to the reduced image instead of the original image and, thus, a description of that process will not be repeated here. Then in S89 the CPU 11 determines whether the amount of available memory is greater than the memory amount B.

If the amount of allocated memory is greater than the memory amount B (S89: YES), then in S90 the CPU 11 reduces the original image and stores the reduced image in the image data memory 13c1 to perform the pre-process of the Retinex process. The pre-process of S90 will be described later with reference to the flowchart in FIGS. 12 and 13.

Then, in S91 the CPU 11 performs the post-process of the Retinex process. The post-process is identical to the post-process in FIG. 9 described in the first embodiment.

If the amount of allocated memory is not greater than the memory amount B (S89: NO), in S92 the CPU 11 calculates the memory amount C. In S92, S11-S16 of FIG. 3 is performed each line of the original image and, thus, a description of that process will not be repeated here. Then in S93 the CPU 11 determines whether the amount of available memory is greater than the memory amount C.

If the amount of allocated memory is greater than the memory amount C (S93: YES), then in S94 the CPU 11 stores a number of lines of the original image required for the mask process in the image data memory 13c1 to perform the pre-process of the Retinex process. The pre-process of S94 will be described later with reference to the flowchart in FIG. 14.

The mask process is a process for performing convolution operations with the filter coefficient F(x, y) acquired when finding the reflectance value and peripheral pixels of the target pixel. The filter coefficient has a prescribed mask size in the vertical and horizontal directions of the image and is found by sequentially masking the image and calculating reflectance values.

Then, in S91 the CPU 11 performs the post-process of the Retinex process. The post-process is identical to the post-process in FIG. 9 described in the first embodiment.

If the amount of allocated memory is not greater than the memory amount C (S93: NO), in S95 the CPU 11 calculates the memory amount D. In S95, S11-S16 of FIG. 3 is performed each line of the reduced image and, thus, a description of that process will not be repeated here. Then in S96 the CPU 11 determines whether the amount of available memory is greater than the memory amount D.

If the amount of allocated memory is greater than the memory amount D (S96: YES), then in S97 the CPU 11 stores a number of lines of the original image required for the mask process in the image data memory, reduces the original image and stores the reduced image in the image data memory 13c1 to perform the pre-process of the Retinex process. The pre-process of S97 will be described later with reference to the flowchart in FIG. 15.

Then, in S91 the CPU 11 performs the post-process of the Retinex process. The post-process is identical to the post-process in FIG. 9 described in the first embodiment.

If the amount of allocated memory is not greater than the memory amount D (S96: NO), then in S98 the CPU 11 performs gamma correction since the amount of available memory is insufficient for performing the Retinex process. The gamma correction process is a process well known in the art for correcting luminance and contrast by calibrating each RGB value for each pixel in the image while referring to a calibration table or the like, and will not be described in detail here.

Note that the steps of S84, S88, S92, and S95 may be performed on the fly in the steps of the steps of S85, S89, S93, and S96 respectively.

Next, the pre-process of S90 will be described with reference to FIGS. 12 and 13. FIGS. 12 and 13 are tables referenced during the pre-process of S90. This pre-process is identical to that shown in FIG. 8 of the first embodiment. In this pre-process, the CPU 11 references the tables in FIGS. 12 and 13 based on the printing parameters and the size of the original image to determine the size of the reduced image and the reduction algorithm.

FIGS. 12 and 13 are look-up tables used to set the reduced image size and reduction algorithm based on the printing mode, paper type, paper size, and original image size. FIG. 12 is a look-up table used for the photo mode, while FIG. 13 is a look-up table used for the normal mode. These tables are stored in the LUT memory 12c of the ROM 12 and are referenced in the process described in S88 of FIG. 11.

The table in FIG. 12 is selected when the print mode has been set to the photo mode. Choices for the reduced image size and the reduction algorithm are first categorized by paper type. In the embodiment, the categories of paper type include glossy paper and plain paper, but may also include other categories, such as inkjet paper.

After paper type, the selections are categorized by paper size, in order from smallest to largest. In this example, the categories of paper size are 4"×6", 5"×7", letter, and A4. Each paper size is further categorized by original image size. In this example, possible original image sizes for the input image are 600×800, 1200×1600, and 2400×3200 (pixels). The reduced image size and reduction algorithm are set based on these sizes.

In the embodiment, the reduced image size can be set to one of three selections, 110×200, 300×400, and 450×600, while the reduction algorithm can be set to one of three types, the average pixel method (ME), the bi-linear method (BL), and the nearest neighbor method (NN). The table in FIG. 13 is used when the printing mode has been set to the normal mode. As in the photo mode, selections are categorized by paper type, paper size, and original image size, and the reduced image size and reduction algorithm are set based on these values.

Figure 14:
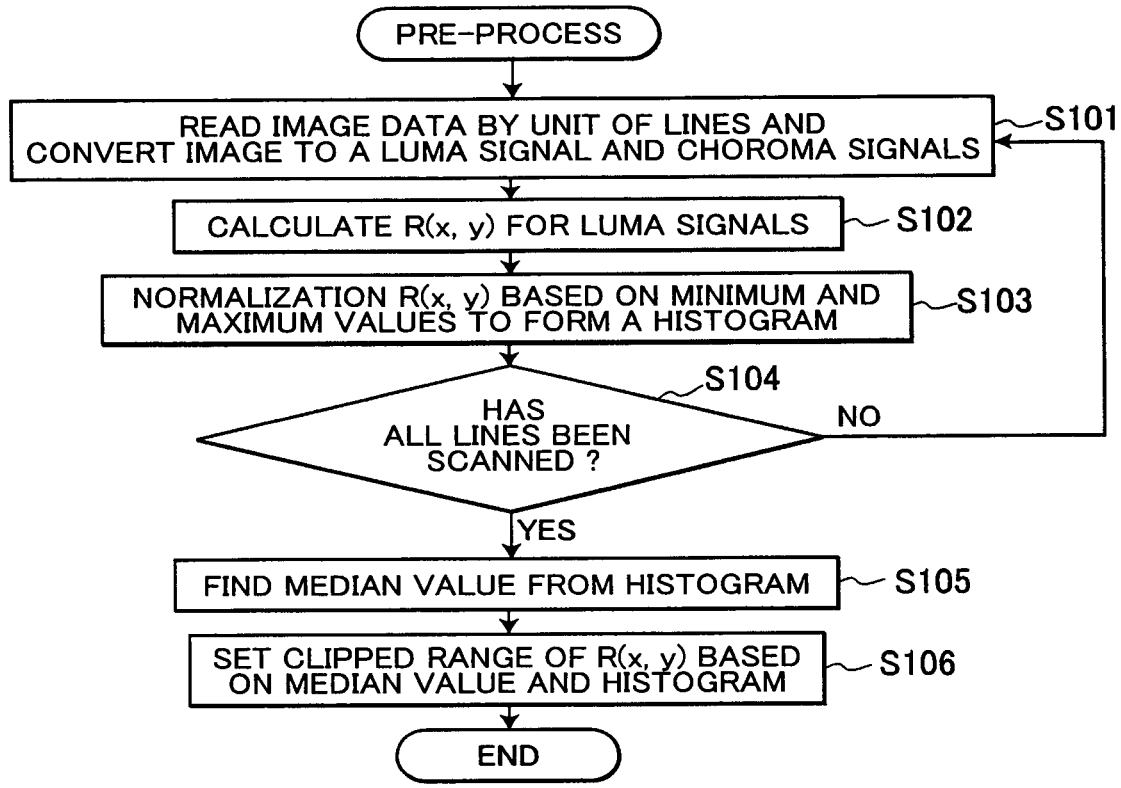
FIG. 14 is a flowchart illustrating steps in a process for storing image data of a number of lines required in an original image mask process according to the second embodiment.

Next, the pre-process of S94 will be described with reference to the flowchart in FIG. 14. In S101 the CPU 11 again reads a number of lines required for the mask process and in S102 finds the reflectance value R(x, y) for the luminance signal. In S103 the CPU 11 normalizes the reflectance value based on the minimum and maximum values obtained in S92 and records the normalized reflectance value in the histogram memory 13c3. When recording values in the histogram memory 13c3, the number of each pixel value between the minimum and maximum values is tabulated for forming a histogram.

In S104 the CPU 11 determines whether the process in S101-S103 has been performed for all lines in the original image. If unprocessed lines remain (S104: NO), then the CPU 11 returns to S101. However, when the process has been completed for all lines (S104: YES), then in S105 the CPU 11 finds a median value from the histogram formed in the histogram memory 13c3. In S106 the CPU 11 sets a clipped range for reflectance values R (x, y) based on the median value and the histogram.

According to the pre-process in S94, the printer 1 can perform the Retinex process, provided that there is sufficient memory for storing luma signals for the number of lines required in the mask process.

Figure 15:
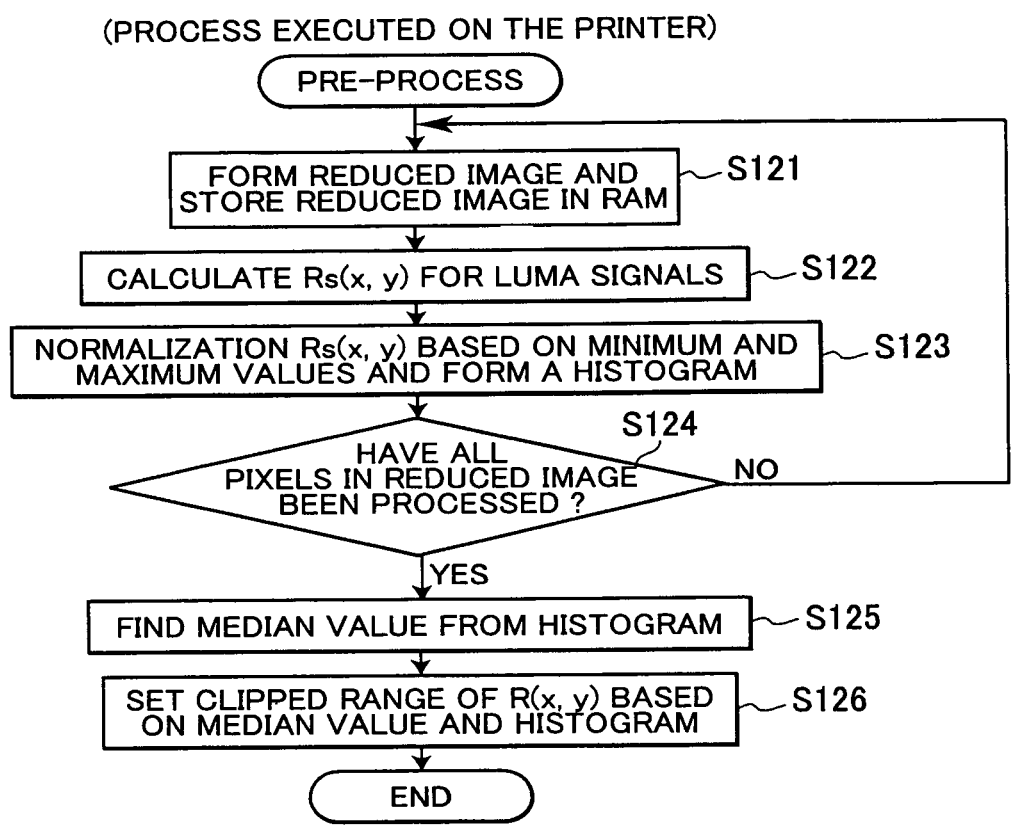
FIG. 15 is a flowchart illustrating steps in a process for storing image data of a number of lines required in a mask process for a reduced image obtained by reducing the original image according to the second embodiment.

Next, the pre-process in S96 will be described with reference to the flowchart in FIG. 15. In this pre-process, the printer 1 reduces the original image according to the nearest neighbor method and stores a number of lines required for performing the mask process on the reduced image in the image data memory 13c1. The process according to this method can be performed quickly using little memory capacity, but there is a risk of a slight decline in image quality.

In S121 the CPU 11 finds a reduction ratio from the size of the original image and the amount of available memory, and again reads the number of lines required for performing the mask process on the reduced image. By finding this reduction ratio, the printer 1 can determine pixels to be read from the original image.

In S122 the CPU 11 finds the reflectance value Rs(x, y) for the luma component Y. In S123 the CPU 11 normalizes the reflectance value based on the minimum and maximum values obtained in S124 and records the normalized reflectance in the histogram memory 13c3. By recording these values in the histogram memory 13c3, the CPU 11 tabulates the number of each pixel value between the minimum and maximum values to form a histogram.

In S124 the CPU 11 determines whether the above process has been completed for all pixels in the original image. If unprocessed pixels remain (S129: NO), then the CPU 11 returns to S126. However, when the process has been completed for all pixels (S124: YES), in S125 the CPU 11 finds a median value from the histogram formed in S123 and in S136 determines a clipped range for reflectance values R(x, y) from this median value and the histogram.

According to the second embodiment described above, the CPU 11 determines whether to give priority to image quality or processing speed based on user-set printing parameters. The printer 1 selects a processing method for achieving good image quality when determining that image quality has priority, and selects a method for achieving a fast processing speed, such as the reduced Retinex method, when the priority is processing speed, provided that the amount of available memory is sufficient for the image process.

While the invention has been described in detail with reference to specific embodiments thereof, it would be apparent to those skilled in the art that many modifications and variations may be made therein without departing from the spirit of the invention, the scope of which is defined by the attached claims.

For example, the color system in the embodiments described above is the ROB color model, but a color system other than the RGB color model may be used. For example, the present invention may be applied to the CMY color model or the like.

In the embodiment described above, the CPU 11 provided in the printer 1 executes the image-processing program according to the present embodiment. However, this program may be provided to a personal computer as an application program that is executed by a CPU or the like provided in the personal computer.

Either the single-scale Retinex (SSR) or multi-scale Retinex (MSR) method may be used in the Retinex process.

In the embodiments described above, the reduced image size is determined based on the print mode, paper type, paper size, and original image size. However, the reduced image size may instead be determined based on one, two or three of these four parameters.

In the image process of the embodiments described above, the CPU 11 performs the Retinex process and the like. However, these processes may be performed with a digital signal processor (DSP). The DSP can be used to execute product-sum operations and other operations more quickly.

What is claimed is:

1. An image processor comprising:
  a memory amount calculating unit configured to calculate, based on a size of an original image having a plurality of pixels, a required memory amount required for performing a Retinex process on the original image;
  a storing unit having a usable memory area that can be used in performing the Retinex process on the original image, the usable memory area having a usable memory amount;
  a mode selecting unit configured to select a mode from among a plurality of modes including a first mode based on both the usable memory amount and the required memory amount;
  a reducing unit configured to reduce the original image to form a reduced image having a plurality of pixels, the number of the plurality of pixels in the reduced image being smaller than the number of the plurality of pixels in the original image; and
  a Retinex process performing unit configured to perform the Retinex process on the original image in the selected mode, wherein
  the Retinex process performing unit comprises:
    a reflectance value calculating unit configured to calculate, when the first mode is selected, a first reflectance value for each pixel in the reduced image based on an average peripheral value of each pixel in the reduced image and a second reflectance value for each pixel in the original image based on an average peripheral value of each pixel in the original image;
    a clipped range calculating unit configured to calculate a first clipped range based on a distribution of the first reflectance values of the plurality of pixels in the reduced image; and
    a correcting unit configured to correct the original image based on both the first clipped range and the second reflectance value.

2. The image processor according to claim 1, wherein the usable memory area stores the second reflectance value.

3. The image processor according to claim 1, further comprising a reduction algorithm determining unit configured to determine a reduction algorithm for reducing the original image, based on both the usable memory amount and the required memory amount, wherein the reducing unit reduces the original image based on the determined reduction algorithm.

4. The image processor according to claim 1, further comprising a printing unit configured to print the corrected image on a recording medium by using the usable memory area.

5. The image processor according to claim 4, further comprising a priority determining unit configured to determine whether priority should be given to image quality or processing speed,
   wherein the mode selecting unit selects the mode based on the usable memory amount, the required memory amount, and the determined priority.

6. The image processor according to claim 1, wherein the plurality of modes further includes a second mode,
   wherein the clipped range calculating unit calculates, when the second mode is selected, a second clipped range based on a distribution of the second reflectance values of the plurality of pixels in the original image, and
   wherein the correcting unit corrects the original image based on both the second clipped range and the second reflectance value.

7. The image processor according to claim 6, wherein the mode selecting unit selects the first mode when the usable memory amount is smaller than the required memory amount and selects the second mode when the usable memory amount is larger than the required memory amount.

8. An image processing method comprising:
   calculating, based on a size of an original image having a plurality of pixels, a required memory amount required for performing a Retinex process on the original image;
   detecting a usable memory amount of a usable memory area that can be used in performing the Retinex process on the original image;
   selecting a mode from among a plurality of modes including a first mode based on both the usable memory amount and the required memory amount;
   reducing the original image to form a reduced image having a plurality of pixels, the number of the plurality of pixels in the reduced image being smaller than the number of the plurality of pixels in the original image, and
   performing the Retinex process on the original image in the selected mode,
   wherein the performing comprises:
      calculating, when the first mode is selected, a first reflectance value for each pixel in the reduced image based on an average peripheral value of each pixel in the reduced image and a second reflectance value for each pixel in the original image based on an average peripheral value of each pixel in the original image;
      calculating a first clipped range based on a distribution of the first reflectance values of the plurality of pixels in the reduced image; and
      correcting the original image based on both the first clipped range and the second reflectance value.

9. The image processing method according to claim 8, further comprising: determining a reduction algorithm for reducing the original image, based on both the usable memory amount and the required memory amount,
   wherein the reducing reduces the original image based on the determined reduction algorithm.

10. A non-transitory computer readable storage device storing a set of program instructions executable on an image processor, the set of program instructions comprising:
   calculating, based on a size of an original image having a plurality of pixels, a required memory amount required for performing a Retinex process on the original image;
   detecting a usable memory amount of a usable memory area that can be used in performing the Retinex process on the original image;
   selecting a mode from among a plurality of modes including a first mode based on both the usable memory amount and the required memory amount;
   reducing the image to form a reduced image having a plurality of pixels, the number of the plurality of pixels in the reduced image being smaller than the number of the plurality of pixels in the original image; and
   performing the Retinex process on the original image in the selected mode,
   wherein the performing comprises:
      calculating, when the first mode is selected, a first reflectance value for each pixel in the reduced image based on an average peripheral value of each pixel in the reduced image and a second reflectance value for each pixel in the original image based on an average peripheral value of each pixel in the original image;
      calculating a first clipped range based on a distribution of the first reflectance values of the plurality of pixels in the reduced image; and
      correcting the original image based on both the first clipped range and the second reflectance value.

11. An image processor comprising:
   a memory amount calculating unit configured to calculate, based on a size of an original image having a plurality of pixels, a required memory amount required for performing a Retinex process on the original image;
   a storing unit having a usable memory area that can be used in performing the Retinex process on the original image, the usable memory area having a usable memory amount configured to store a pixel group that is based on the plurality of pixels in the original image;
   a mode selecting unit configured to select a mode from among a plurality of modes including a first mode based on both the usable memory amount and the required memory amount;
   a reducing unit configured to reduce the image to form a reduced image having a plurality of pixels, the number of the plurality of pixels in the reduced image being smaller than the number of the plurality of pixels in the original image;
   a Retinex process performing unit configured to perform the Retinex process on the original image in the selected mode; and
   a pixel group determining unit configured to determine the number of pixels in the original image included in the pixel group, based on both the usable memory amount and the required memory amount,
   wherein the Retinex process performing unit comprises:
      a reflectance value calculating unit configured to calculate, when the first mode is selected, a first reflectance value for each pixel in the reduced image based on an average peripheral value of each pixel in the reduced image and a second reflectance value for each pixel in the original image in the pixel group based on an average peripheral value of each pixel in the original image;
      a clipped range calculating unit configured to calculate a first clipped range based on a distribution of the first reflectance values of the plurality of pixels in the reduced image; and
      a correcting unit configured to correct the original image based on both the first clipped range and the second reflectance value.

* * * * *